(12) United States Patent  
Kiliccote

(10) Patent No.: US 7,543,748 B2  
(45) Date of Patent: Jun. 9, 2009

(54) METHOD AND SYSTEM FOR CREATING AND USING REDUNDANT AND HIGH CAPACITY BARCODES

(75) Inventor: Han Kiliccote, Los Altos, CA (US)

(73) Assignee: Pisafe, Inc., Sunnyvale, CA (US)

( * ) Notice: Subject to any disclaimer, the term of this patent is extended or adjusted under 35 U.S.C. 154(b) by 51 days.

(21) Appl. No.: 11/357,369

(22) Filed: Feb. 16, 2006

(65) Prior Publication Data

US 2006/0196950 A1    Sep. 7, 2006

Related U.S. Application Data

(60) Provisional application No. 60/654,068, filed on Feb. 16, 2005, provisional application No. 60/751,035, filed on Dec. 16, 2005.

(51) Int. Cl.
| | |
|---|---|
| G06K 9/36 | (2006.01) |
| G06K 9/80 | (2006.01) |
| G06K 7/10 | (2006.01) |
| G06K 19/00 | (2006.01) |
| G06K 7/00 | (2006.01) |
| G06K 7/14 | (2006.01) |

(52) U.S. Cl. ............................. 235/462.1; 235/462.01; 235/487; 235/454; 235/435

(58) Field of Classification Search ............ 235/462.01, 235/462.1, 487, 454, 435; 382/183  
See application file for complete search history.

(56) References Cited

U.S. PATENT DOCUMENTS

| 4,720,860 A | | 1/1988 | Weiss | |
|---|---|---|---|---|
| 4,885,778 A | | 12/1989 | Weiss | |
| 5,221,838 A | * | 6/1993 | Gutman et al. | .............. 235/379 |
| 5,317,636 A | | 5/1994 | Vizcaino | |
| 5,606,609 A | | 2/1997 | Houser | |
| 5,635,906 A | * | 6/1997 | Joseph | ..................... 340/572.3 |
| 5,670,771 A | * | 9/1997 | Watanabe et al. | ...... 235/462.18 |
| 5,862,270 A | * | 1/1999 | Lopresti et al. | ............. 382/306 |
| 5,873,735 A | | 2/1999 | Yamada | |
| 6,016,476 A | | 1/2000 | Maes et al. | |
| 6,279,830 B1 | * | 8/2001 | Ishibashi | ..................... 235/494 |
| 6,446,869 B1 | * | 9/2002 | Seevers et al. | ......... 235/462.43 |
| 6,512,919 B2 | * | 1/2003 | Ogasawara | .............. 455/422.1 |

(Continued)

*Primary Examiner*—Daniel Walsh  
(74) *Attorney, Agent, or Firm*—Pillsbury Winthrop Shaw Pittman LLP

(57) ABSTRACT

Methods and systems for creating and using redundant and very high capacity barcodes are presented. An individual barcode can include one or more finder patterns, one or more position detection patterns, one or more alignment patterns, one or more orientation detection patterns, one or more format and version information patterns, and one or more modules, where each of these sections can be of a separate size, shape, color and location from the other of these sections. Each individual barcode can be encoded with a separate chunk of data. The individual barcodes can be combined into a composite barcode, which can have patterns and modules used can include many different sizes, shapes, colors and locations of such patterns and modules within the barcode. The individual and composite barcodes can be used to transfer data to a capture device. Original data can be expanded and divided into chunks of data. The chunks of data can be encoded into individual or composite barcodes and then sequentially displayed as a moving image. A device can capture each frame of the moving image of barcodes and decode them into chunks. The original data can then be derived from the decoded chunks of data.

47 Claims, 25 Drawing Sheets

U.S. PATENT DOCUMENTS

| | | |
|---|---|---|
| 6,685,095 B2 * | 2/2004 | Roustaei et al. ........ 235/472.01 |
| 6,757,826 B1 | 6/2004 | Paltenghe |
| 6,863,218 B2 * | 3/2005 | Muramatsu ............ 235/462.25 |
| 6,937,989 B2 | 8/2005 | McIntyre et al. |
| 6,950,800 B1 | 9/2005 | McIntyre et al. |
| 6,988,199 B2 | 1/2006 | Toh et al. |
| 7,021,534 B1 * | 4/2006 | Kiliccote .................... 235/380 |
| 7,114,656 B1 * | 10/2006 | Garver ................. 235/462.46 |
| 7,207,481 B2 * | 4/2007 | Barenburg et al. .......... 235/382 |
| 7,266,693 B1 | 9/2007 | Potter et al. |
| 7,379,921 B1 | 5/2008 | Kiliccote |
| 7,380,708 B1 | 6/2008 | Kiliccote |
| 2001/0013550 A1 * | 8/2001 | Watanabe et al. ...... 235/462.25 |
| 2001/0025886 A1 * | 10/2001 | He et al. ................ 235/462.25 |
| 2001/0045461 A1 * | 11/2001 | Schuessler ............ 235/462.07 |
| 2002/0020747 A1 * | 2/2002 | Wakamiya et al. ..... 235/462.11 |
| 2002/0023215 A1 | 2/2002 | Wang et al. |
| 2002/0041712 A1 * | 4/2002 | Roustaei et al. ............. 382/199 |
| 2002/0079370 A1 * | 6/2002 | Wood et al. ................. 235/454 |
| 2002/0145038 A1 * | 10/2002 | O'Hagan et al. ........... 235/383 |
| 2003/0014315 A1 | 1/2003 | Jaalinoja et al. |
| 2003/0080191 A1 * | 5/2003 | Lubow et al. .......... 235/462.01 |
| 2003/0161475 A1 * | 8/2003 | Crumly et al. .............. 380/280 |
| 2004/0026510 A1 * | 2/2004 | Cheung et al. ........... 235/462.1 |
| 2004/0035935 A1 * | 2/2004 | Takahashi et al. ...... 235/462.09 |
| 2004/0046025 A1 * | 3/2004 | Lebaschi et al. ......... 235/462.1 |
| 2004/0064704 A1 | 4/2004 | Rahman |
| 2004/0089727 A1 * | 5/2004 | Baharav et al. ............. 235/494 |
| 2004/0199427 A1 * | 10/2004 | van der Loo .................. 705/16 |
| 2004/0267663 A1 | 12/2004 | Karns et al. |
| 2005/0029354 A1 * | 2/2005 | Frantz et al. ........... 235/462.01 |
| 2005/0061892 A1 * | 3/2005 | Lapstun et al. .............. 235/494 |
| 2005/0109846 A1 * | 5/2005 | Lubow .................. 235/462.01 |
| 2005/0199721 A1 * | 9/2005 | Chang et al. ............. 235/462.1 |
| 2006/0045164 A1 * | 3/2006 | Schuh et al. .................... 374/1 |
| 2006/0054695 A1 * | 3/2006 | Owada ....................... 235/440 |
| 2006/0118631 A1 * | 6/2006 | Lubow et al. .......... 235/462.01 |
| 2006/0157574 A1 * | 7/2006 | Farrar et al. ................. 235/494 |
| 2006/0196950 A1 * | 9/2006 | Kiliccote .................... 235/494 |
| 2007/0114285 A1 * | 5/2007 | Chang et al. ............. 235/462.1 |
| 2007/0152060 A1 * | 7/2007 | Kiliccote ............... 235/462.09 |

* cited by examiner

METHOD AND SYSTEM FOR CREATING AND USING REDUNDANT AND HIGH CAPACITY BARCODES

CROSS-REFERENCE TO RELATED APPLICATIONS

This application claims the benefit of priority from U.S. Provisional Patent Application No. 60/654,068 to Han Kiliccote, which was filed on Feb. 16, 2005 and entitled "Method of Transferring Data through Moving Images," and which is fully incorporated herein by reference for all purposes.

This application also claims the benefit of priority from U.S. Provisional Patent Application No. 60/751,035 to Han Kiliccote, which was filed on Dec. 16, 2005 and entitled "Method and System for Creating and Using Barcodes," and which is fully incorporated herein by reference for all purposes.

BACKGROUND OF THE INVENTION

1. Field of the Invention

The present invention generally relates to barcodes. More specifically, the present invention relates to methods and systems for creating barcodes where one or a set of barcodes are used to transfer data to a device.

2. Description of Related Art

Typically, barcodes are machine-readable representation of information displayed in a visual format on a surface. There are different types of barcodes. Linear barcodes store data in the widths and spacing of printed parallel lines. Stacked barcodes and 2-dimensional (2D) barcodes, which represent stored data in patterns of dots, concentric circles and hidden images, have a higher data storage capacity than linear barcodes. Barcodes may be read by optical scanners called barcode readers and/or scanned from an image by special software.

To increase the amount of information that can be stored in a given space, linear requirements of simple barcodes have been extended with matrix codes. Matrix codes are a type of 2D barcode. Matrix codes are made of a grid of square cells called modules. Stacked barcodes are similar to 2D barcodes. Stacked barcodes are formed by taking a traditional linear barcode and placing it in an envelope that allows multiple rows of linear barcodes. FIG. 1 illustrates an example of a stacked barcode 100 called QRCode[1] typically used in the art today.

The mapping between data and the barcode that embeds the data is called a symbology. Symbologies include specifications relating to various parameters, such as, the encoding of the data, the start and stop markers into bars, dots, modules and spaces, the size of the quiet zone that may be required before and after the barcode. Symbologies can also include a specification for forward error correction used in the barcode.

The forward error correction used in barcode standards usually encodes the data in redundant fashion so that if a portion of the barcode is unreadable, the data can still be recovered. FIG. 2 illustrates a typical placement 210 of redundancy data in QRCode 100. Reed Solomon is a popular error correction scheme. The forward error correction scheme used in barcodes allows recovery of certain types of errors such as errors related to erasure, dirt and minor lighting changes (such as shadows on certain portions of the barcodes).

Linear and 2D barcode symbologies may use horizontal and vertical timing patterns to facilitate decoding of the barcode. The timing patterns usually include a one-module wide row or column of alternating dark and light modules, commencing and ending with a dark module. Linear and 2D barcode symbologies may use position detection patterns that enable the symbol density and version to be determined and may provide datum positions for determining module coordinates.

The timing patterns in two popular barcode standards are shown in FIGS. 3 and 4. FIG. 3 illustrates typical timing patterns 310 in QRCode 100, while FIG. 4 illustrates typical timing patterns 410 in a DataMatrix 400 barcode. In QRCode 100 and DataMatrix 400, horizontal and vertical timing patterns 310, 410 respectively consist of a one module wide row or column of alternating dark and light modules, commencing and ending with a dark module. In QRCode 100, the horizontal timing pattern runs across row 6 of the symbol between the separators for the upper position detection patterns; the vertical timing pattern similarly runs down column 6 of the symbol between the separators for the left-hand position detection patterns. The timing patterns enable the symbol density and version to be determined and provide datum positions for determining module coordinates.

Existing symbologies encode symbols in a linear or 2D image. More specifically, such symbologies use black and white modules, bars or dots that overall define the barcode image. When decoding a linear or 2D code example, various cases or causes of decoding confusion, error or failure may arise. For example, in one case, consecutive long sequences of white, or black, modules may render it hard to determine the exact number of consecutive white, or black, modules in the long sequence due to reader or scanner distortion, as well as the viewing angle of the reader or scanner relative to the plane of the barcode.

In another case, the typical barcode may utilize various patterns to determine the orientation and location of the image. These recognition patterns might repeat themselves in the data structure of the barcode. Such repetition might render decoding the barcode a difficult, if not impossible, task, because the software associated with the reader or scanner will interpret the data as an orientation or location pattern and never actually decode the data associated with that portion of the barcode.

In a further case, due to the large possible orientations of the reader or scanner relative to the plane of the barcode, each symbol may take on a different size and/or shape relative to the scanned or read image. The symbologies may assign a timing pattern in the image and try to resolve the location of each symbol through the timing and location patterns. At large or highly skewed viewing angles, this approach can result in decoding failure because the symbols may scale up to distorted and different-sized shapes at the final image that are unrecognizable (i.e., un-decodable) by the scanner or reader software. FIG. 5 illustrates a typical difference 510 between module sizes due to certain perspective distortions, such as parallax, of a typical barcode image 500.

In another case, portions of a barcode displayed on a conventional CRT display or an LCD display can be obscured by a video detection device, such as a camera. FIGS. 6-7 illustrate the black bands that can result from taking a photograph of a barcode that is displayed on a CRT 600 or an LCD 700 display, respectively.

In a case related to forward error correction in barcodes, adding redundancy to the barcode can make barcodes larger and cause decoding error or failure. FIG. 8 illustrates the same data encoded in QRCode 100, but with a higher level of conventional error correction 800. As shown in FIG. 6, when compared to FIG. 1, when such high-level error correction is used, the barcode becomes larger (i.e., more densely packed with modules). When the barcode is larger, the number of scanned or read pixels per module gets smaller, which increases the probability of decoding errors. This higher error probability counters the reason why the forward error correction was added in the first place. Thus, in practice, when the number of pixels allocated per module drops below a certain level, the number of errors may make the barcode totally unusable even with forward error correction.

In a further case related to forward error correction in barcodes, the amount of redundancy that can be added within the barcode is limited. For example, the QRCode symbology limits the error correction to about 30% of area allotted for data within the barcode. This case is further aggravated because the amount of that data that can be represented within the barcode is limited. For example, the maximum data allowed in a QRCode barcode is about 3,000 (3 k) bytes of information.

Hence, it would be desirable to provide one or more methods and/or systems that are adapted to creating barcodes in a more efficient manner, while solving one or more reading, scanning and/or decoding issues.

BRIEF DESCRIPTION OF THE DRAWINGS

Aspects and features of the present invention will become apparent to those ordinarily skilled in the art from the following detailed description of certain embodiments of the invention in conjunction with the accompanying drawings, wherein.

DETAILED DESCRIPTION OF THE INVENTION

The present invention will now be described in detail with reference to the drawings, which are provided as illustrative examples of the invention so as to enable those skilled in the art to practice the invention and are not meant to limit the scope of the present invention. Where certain elements of the present invention can be partially or fully implemented using known components or steps, only those portions of such known components or steps that are necessary for an understanding of the present invention will be described, and detailed description of other portions of such known components or steps will be omitted so as not to obscure the invention. Further, the present invention is intended to encompass presently known and future equivalents to the components referred to herein by way of illustration.

In certain embodiments of the present invention, a method is proposed that is capable of creating a matrix or symbology including an array of nominally rectangular modules arranged in an overall rectangular pattern. As used herein, rectangular is intended to include a square shape.

The overall rectangular pattern may include a finder pattern located at the center or corners of the symbol. The finder pattern may be configured in such a way as to facilitate location of its position, size and inclination within the barcode. The method may use a scheme involving color encoding of the finder pattern, which can increase the reliability of the barcode as well as its decoding speed.

The overall rectangular pattern may include one or more position detection patterns that allow a decoding algorithm to further verify that the barcode exists and to facilitate detection of the orientation of the barcode. The position detection pattern can be encoded, for example, such that similar patterns have a low probability of being encountered in or in the vicinity of the barcode or in pictures without the barcode. This can help enable rapid identification of a possible barcode in the field of view of the reader or scanner.

The overall rectangular pattern may include alignment and/or orientation detection patterns that can aid the decoding algorithm to further adjust the location and/or orientation of the barcode for decoding purposes. The over all rectangular pattern may include format and version information.

Figure 1:
FIG. 1 illustrates an example of a stacked barcode called QRCode typically used in the art today.
Figure 2:
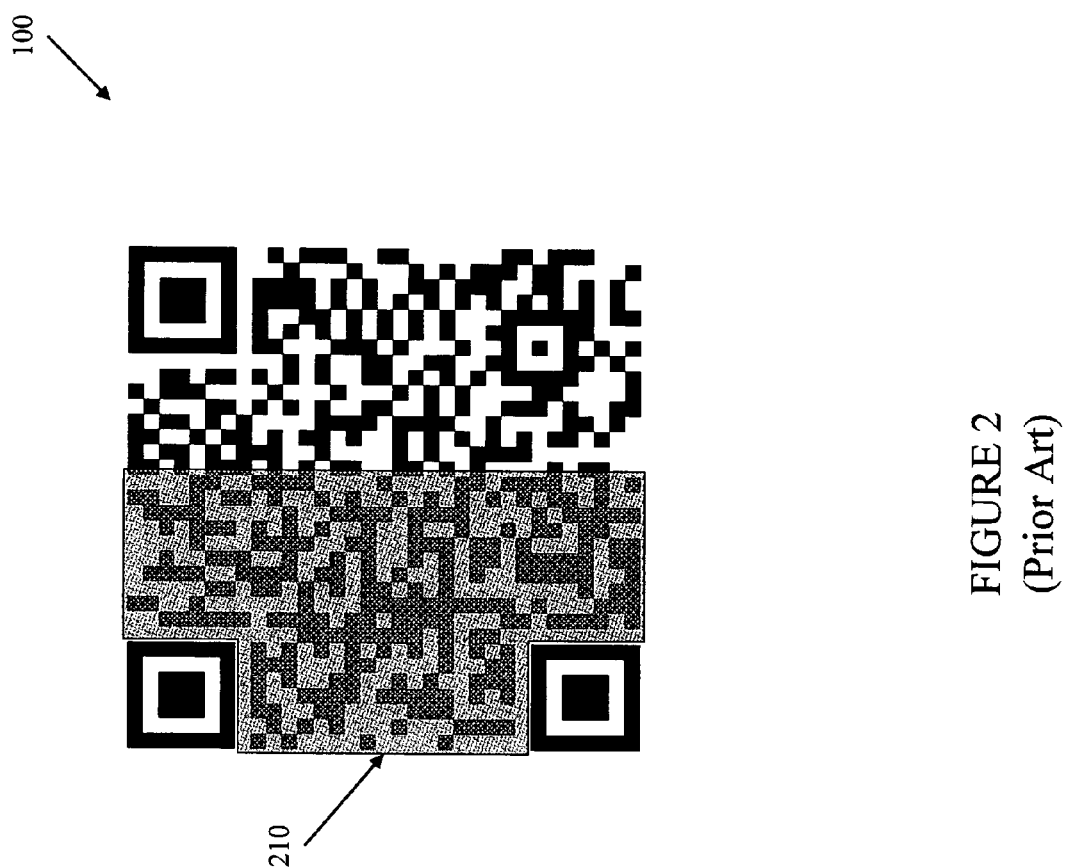
FIG. 2 illustrates a typical placement of redundancy data in a QRCode barcode.
Figure 3:
FIG. 3 illustrates typical timing patterns in a QRCode barcode.
Figure 4:
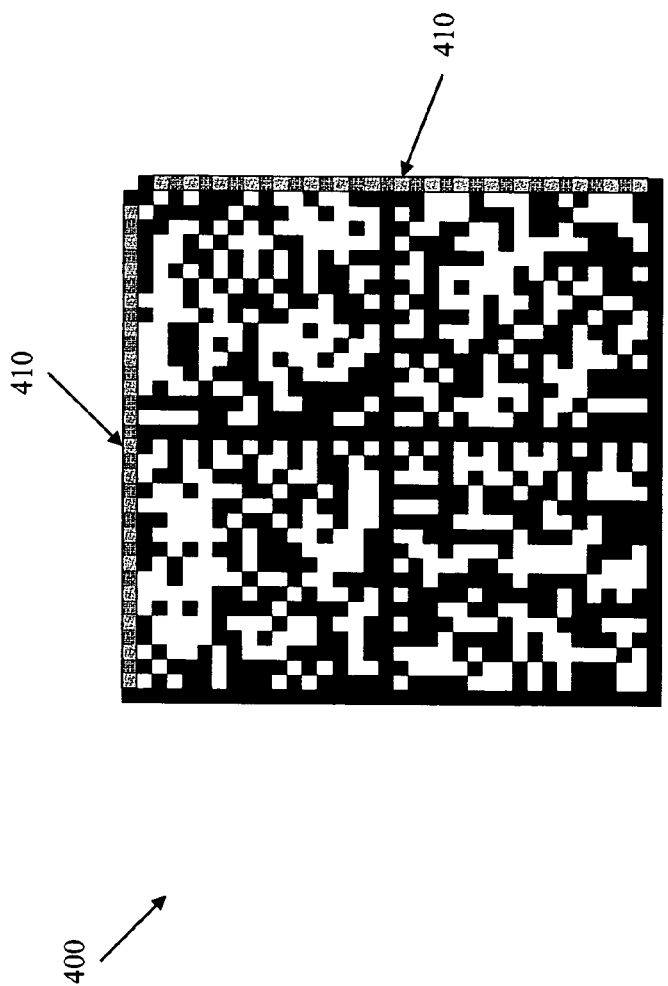
FIG. 4 illustrates typical timing patterns in a DataMatrix barcode.
Figure 5:
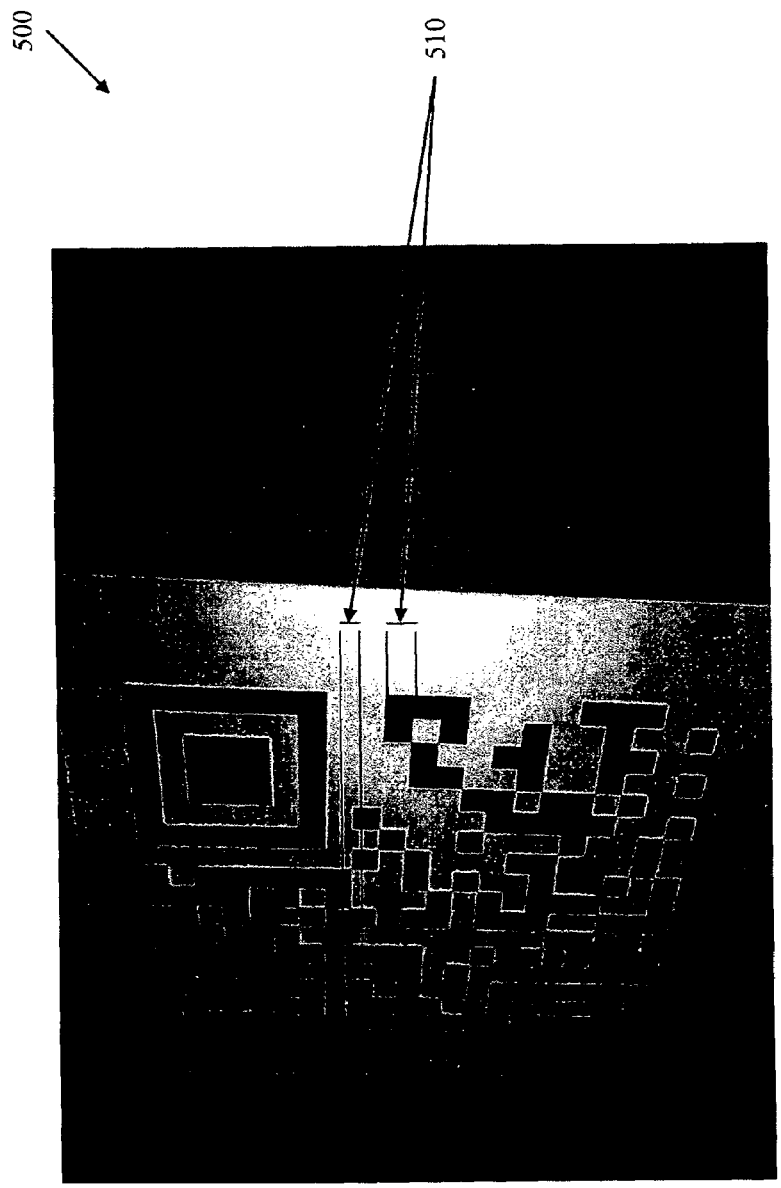
FIG. 5 illustrates a typical difference between module sizes due to certain perspective distortions, such as parallax, of a typical barcode image.
Figure 6:
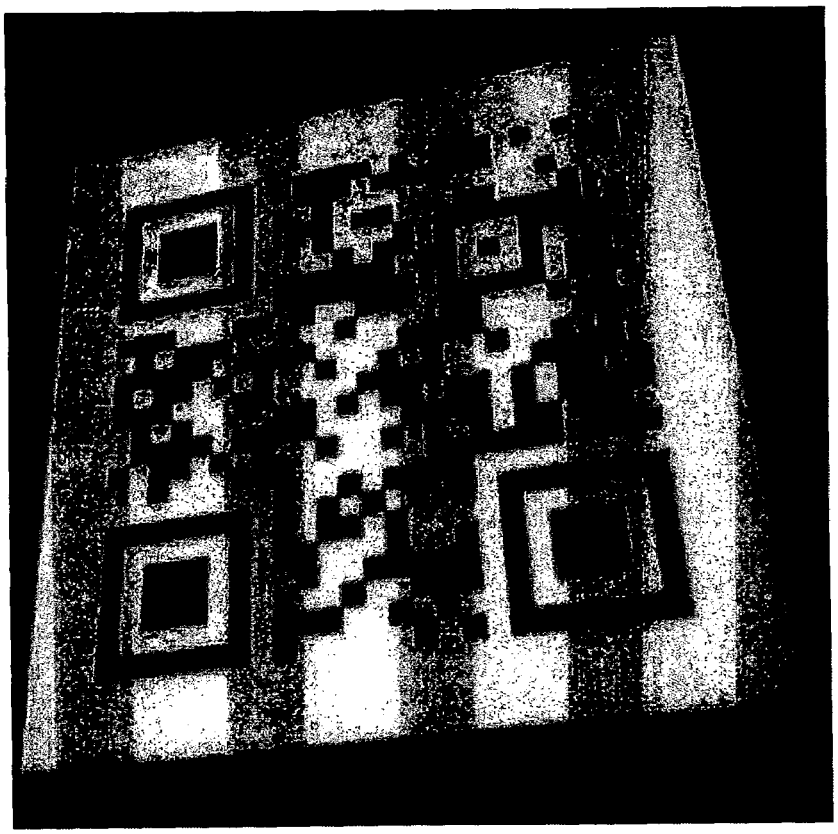
FIGS. 6-7 illustrate the black bands that can result from taking a photograph of a barcode that is displayed on a CRT or an LCD display, respectively.
Figure 7:
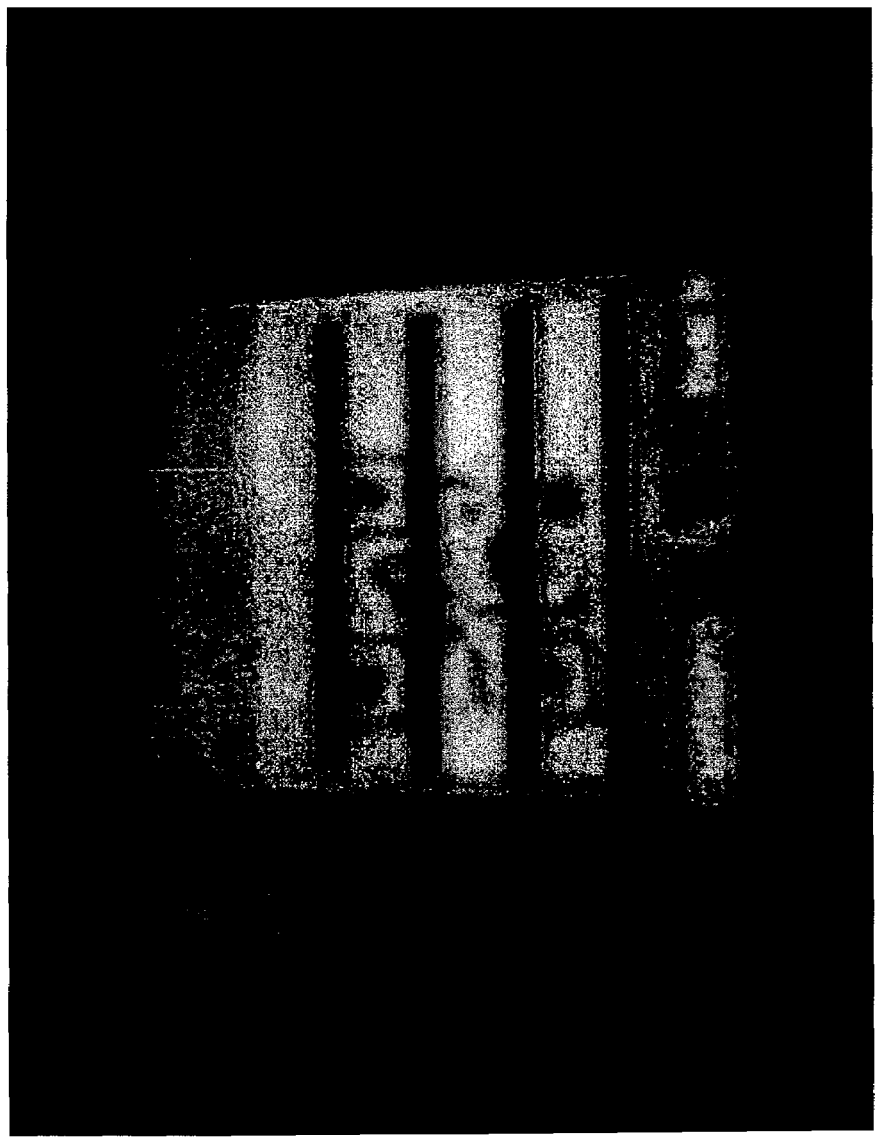
Figure 8:
FIG. 8 illustrates the same data encoded in the QRCode of FIG. 1, but with a higher level of conventional error correction.
Figure 9:
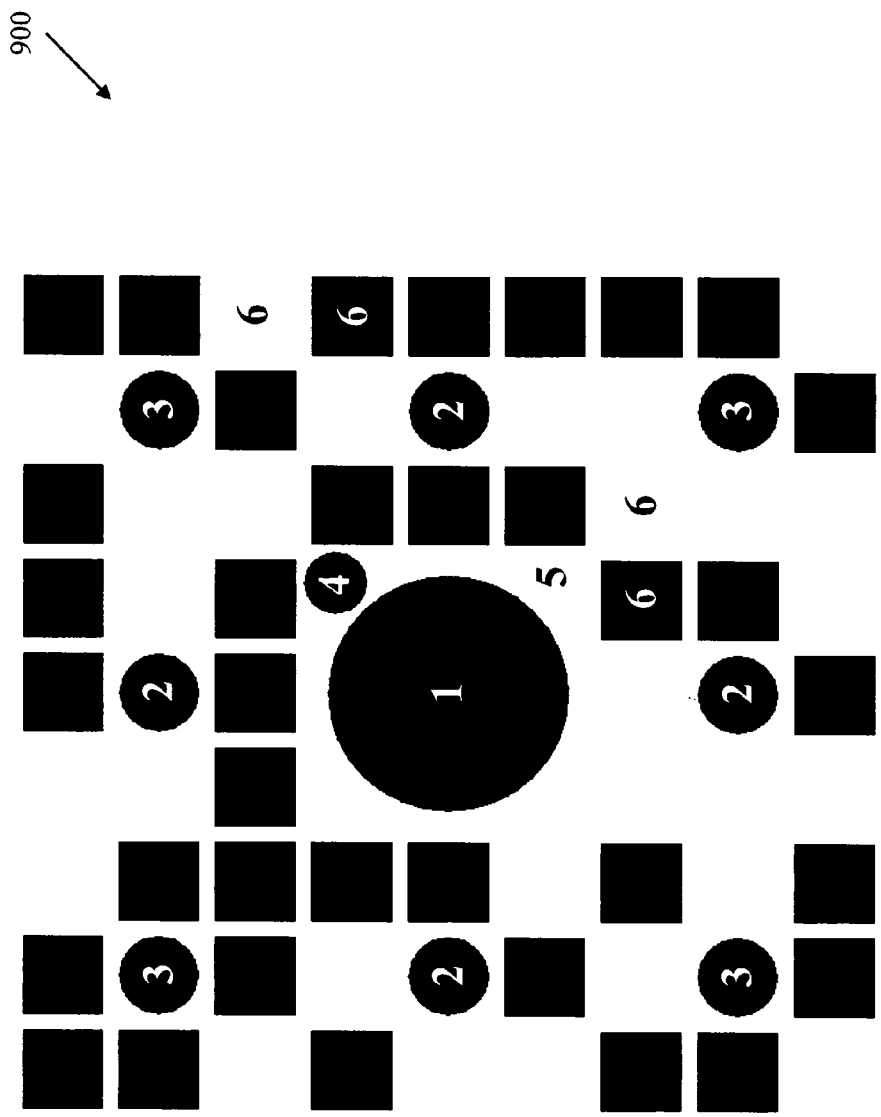
FIGS. 9-11 illustrate schematic diagrams of exemplary instances of color coded barcodes generated according to certain embodiments of the present invention.
Figure 10:
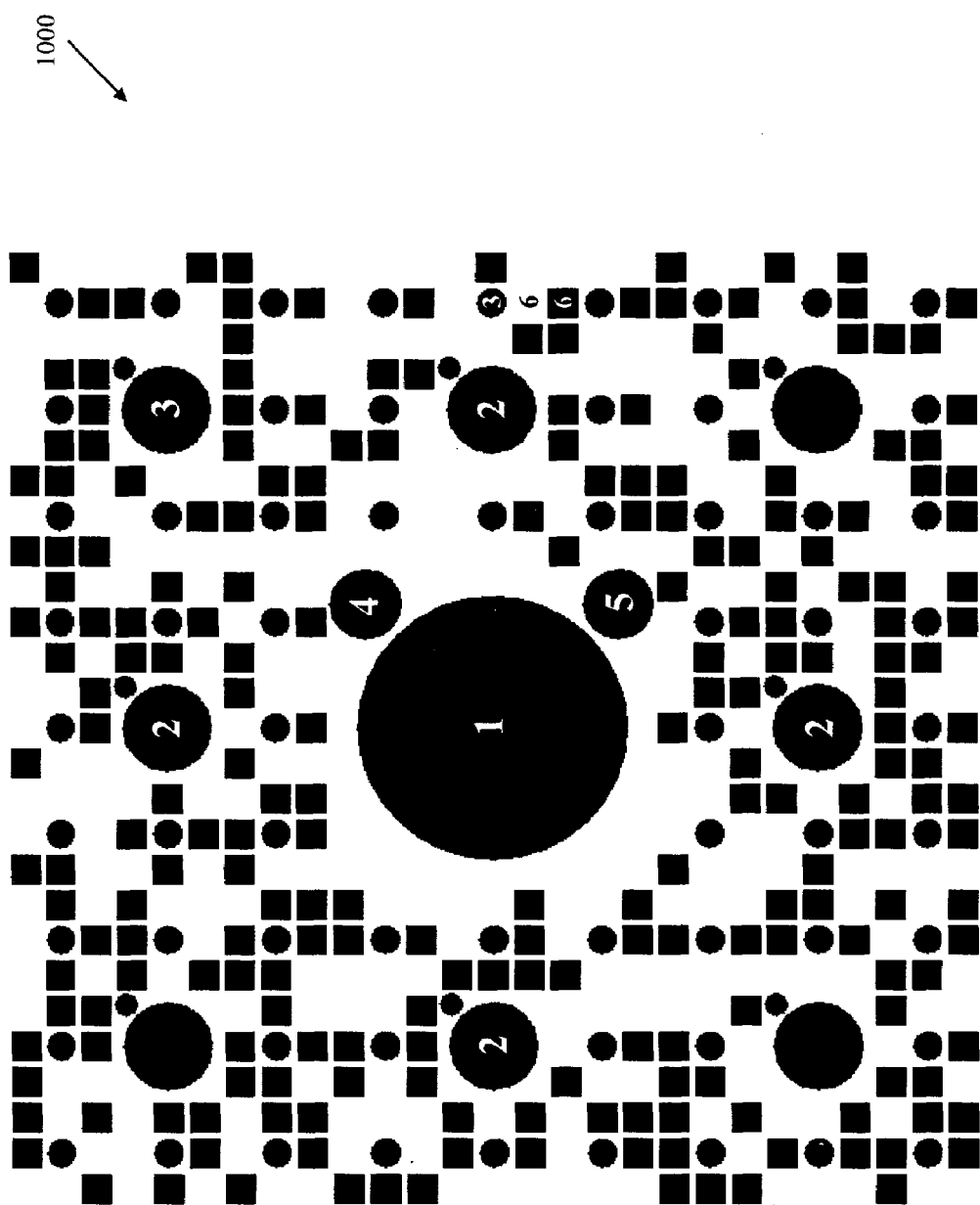
Figure 11:
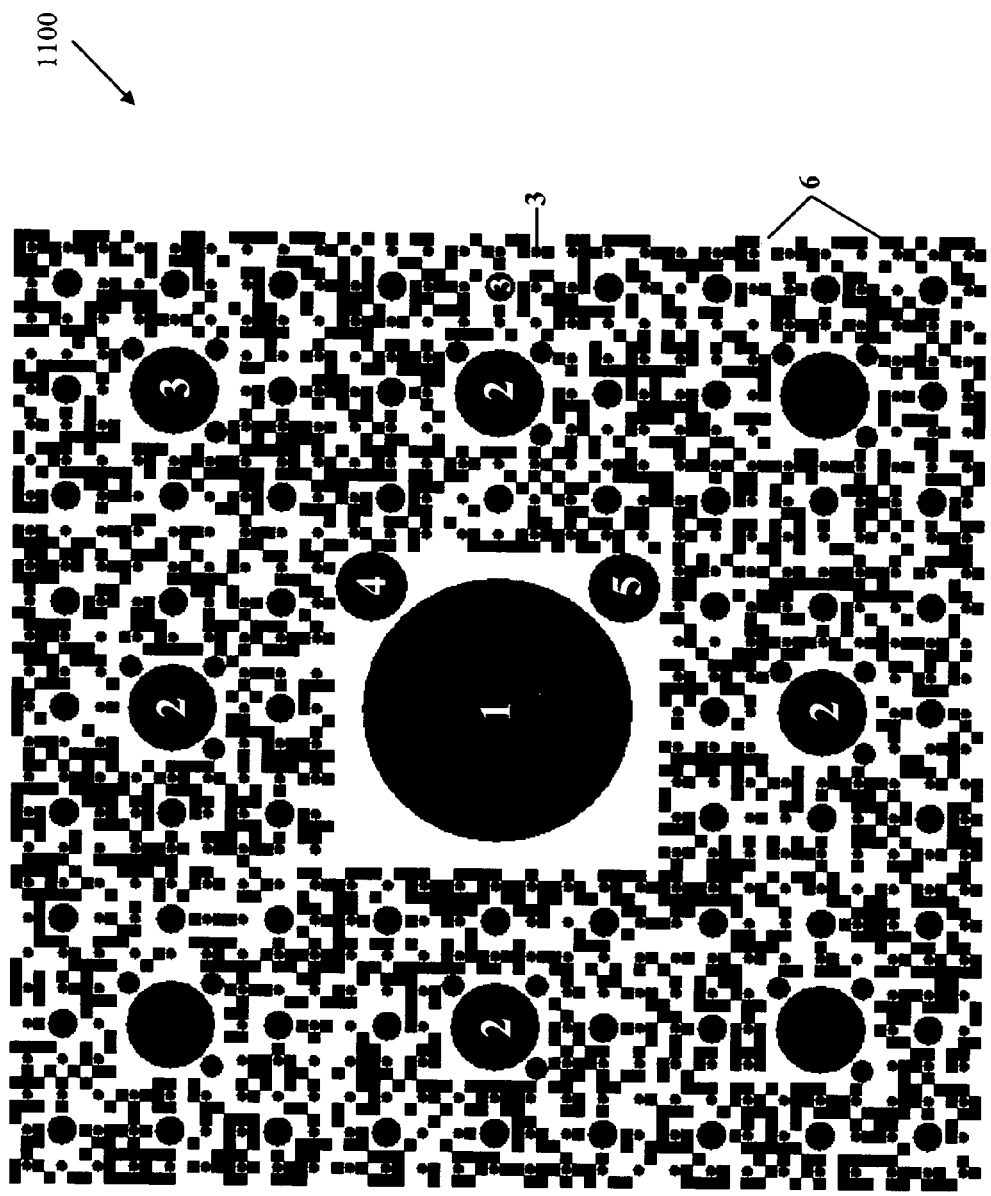

FIGS. 9-11 illustrate schematic diagrams of exemplary instances of color coded barcodes generated according to certain embodiments of the present invention. As shown in FIG. 9, a barcode 900 can include one or more finder patterns 1, one or more position detection patterns 2, one or more alignment patterns 3, one or more orientation detection patterns 4, one or more format and version information patterns 5, and one or more modules 6. Finder pattern 1 can be, for example, a blue circle that is approximately at the center of barcode 900 and can be, for example, relatively larger than the remaining patterns and modules within barcode 900. The remaining patterns 2-5 can also be, for example, colored circles located at certain places within barcode 900. Position detection and alignment patterns 2, 3 can be blue and approximately the same relative size, albeit of a differing shape, as black and white rectangular modules 6. Orientation detection and format and version information patterns 4, 5 can also be, for example, circles, but perhaps of a different color that the other patterns, such as, for example, red.

FIGS. 10 and 11 show barcodes 1000, 1100, respectively, with patterns and modules 1-6 representatively similar to those described in relation to FIG. 9 and barcode 900. However, each of barcodes 1000, 1100 represents an increasingly more dense, or data rich, barcode; that is, barcode 1000 includes approximately eight (8) instances of barcode 900, and barcode 1100 includes approximately eight (8) instances of barcode 1000 (i.e., 64 instances of barcode 900). As shown in FIGS. 10 and 11, the patterns and modules used can include many different sizes, shapes, colors and locations of such patterns and modules within the barcode to aid in successfully recognizing and reliably decoding the barcode.

As will become evident to those skilled in the art upon review of the teachings of this detailed disclosure, many variations and omissions of shapes, sizes, colors (or shades of a single color, for example, in grayscale) and locations can be used for the one or more patterns and modules of barcodes 900, 1000, 1100. While an exhaustive description of each and every possible combination of such variations and omissions is impractical in this disclosure, each and every combination of these variations and omissions are nevertheless intended to fall within the scope of one or more embodiments of the present invention.

In certain embodiments of the present invention, data can be transferred to a devices using one or a set of barcodes. The data that will be transferred can be represented as a set of smaller barcodes as described later in this disclosure. For example, the data that needs to be transferred can be divided into smaller chunks of data and then each chunk can then be transformed into a separate barcode. The barcodes can then be displayed on a display consecutively, one after the other, or a subset or all of them can be displayed simultaneously on a display or printed on a surface. The receiving device may capture some or all of these barcodes through, for example, a camera or other similar video capturing means and can decode the content of each barcode or set of barcodes and reconstruct the data from the decoded chunks of data.

In certain embodiments of the present invention, the barcodes can be broken into multiple chunks in a two step process, with the first step being optional. The optional first step can be adding redundancy to the data through a forward error correction mechanism. The second step is to divide the data, either with or without additional redundancy, into multiple chunks. The optional redundancy can be added through a redundancy scheme also called sharing scheme, digital fountain, threshold scheme or data splitting scheme, where the data is divided into multiple chunks where a subset can be used to reconstruct the data in its entirety. Any method to add redundancy through a continuous sharing scheme where the data is divided into chunks of equal length where a subset of the chunks can be used to reconstruct the data is also described herein.

The chunks can be transformed into images using a linear or 2D barcodes. Each barcode can contain a forward error correction scheme that allows reconstruction of the chunks even though certain portions of the image is damaged or is not captured correctly through the camera.

The display, such as, but not limited to, a computer screen, cell phone screen, personal digital assistant (PDA) screen, television screen, projector screen and the like, can display these images consecutively to create a moving image where each frame can be a different image (i.e., can be a barcode representation of different chunks of the data). A camera, for example, in the barcode decoding device to which the data is to be transferred can capture the moving images. The camera can identify the different frames as separate images. An image recognition algorithm, such as a barcode recognition algorithm, running in the device can identify each individual image. The algorithm then decodes a certain number of these images and converts them into data chunks, which ultimately can make up the totality of the data.

As used with certain embodiments of the invention, the maximum practical rate for displaying the frames on a display is limited by, for example, two factors: the refresh frequency of the display, usually measured in Hertz (Hz), and the response time of the display element(s) making up the display, usually measured in milliseconds (ms). For the refresh frequency, values on the order of about 50 Hz up to about 100 Hz are common. For response time, values on the order of about 4 ms up to about 20 ms are common. However, other values for both of these factors are contemplated by the present invention. Thus, for commonly used displays, such as, for example, CRT monitors, TV screens and LCD displays, a value of at least 20 frames per second is generally safe for displaying frames. The maximum data that can be encoded per frame is generally dependent on the screen resolution, how much of the screen space is devoted for the display of the images, and how many pixels are used per module. Practical values are between about 64 bits to about 200 kilobits per frame. However, as display technology improves, so to will this practical range of bits per frame. Given a safe frame rate of at least 20 frames per second and a bit density per frame of between about 64 bits and 200 kilobits, certain embodiments of the invention can transfer data at a rate of about 1.28 kilobits per minute up to about 40 kilobits per minute. However, it will be apparent to those skilled in the art that a greater or lesser frame and bit density can be used within certain embodiments of the invention.

When a defined number of data chunks are recovered, according to certain embodiments, these chunks can be used to reconstruct the data or a new expanded data if a forward error correction scheme was deployed. If a forward error correction scheme was deployed, the inverse of the forward error correction scheme can be applied to recover the data.

Figure 12:
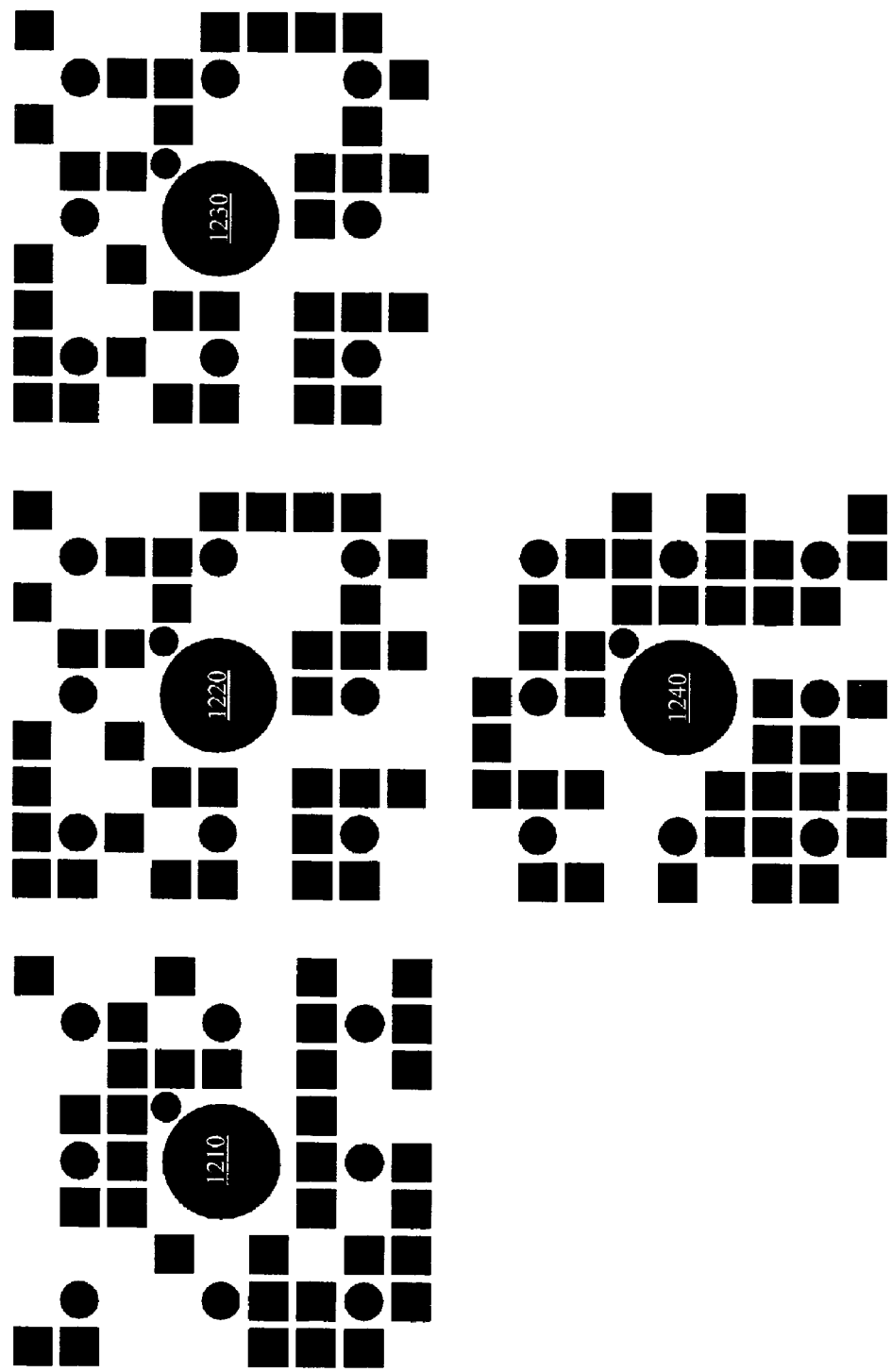
FIG. 12 illustrates an exemplary set of equally-sized barcodes that each can embody a chunk of data such that a receiving device can capture and decode the chunks to ultimately acquire the data according to certain embodiments of the present invention.

FIG. 12 illustrates an exemplary set of equally-sized barcodes that each can embody a chunk of data such that a receiving device can capture and decode the chunks to ultimately acquire the data according to certain embodiments of the present invention. As illustrated in FIG. 12, barcodes 1210-1240 can each be encoded with a chunk of data, or expanded data if a forward error correction scheme was used.

Barcodes 1210-1240 can be consecutively displayed for the receiving device or can be displayed in a group for the receiving device. If barcodes 1310-1340 are displayed in a group, such as, for example, by printing the group on one or multiple pieces of paper or surface (e.g., a magazine page, a product or product packaging, etc.), then the user of the receiving device can selectively acquire one or more of the barcodes in the group for decoding until the original data, or expanded data, is recovered (or until all of the barcodes in that group have been acquired and decoded, as possible).

Figure 13:
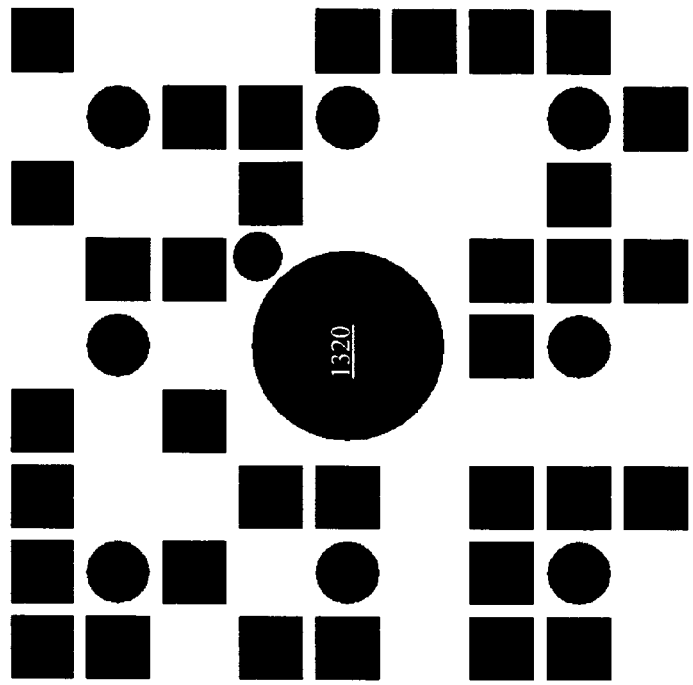
FIG. 13 illustrates a set of unequally-sized barcodes that can be displayed on a display or printed on a surface according to certain embodiments of the present invention.
Figure 13:
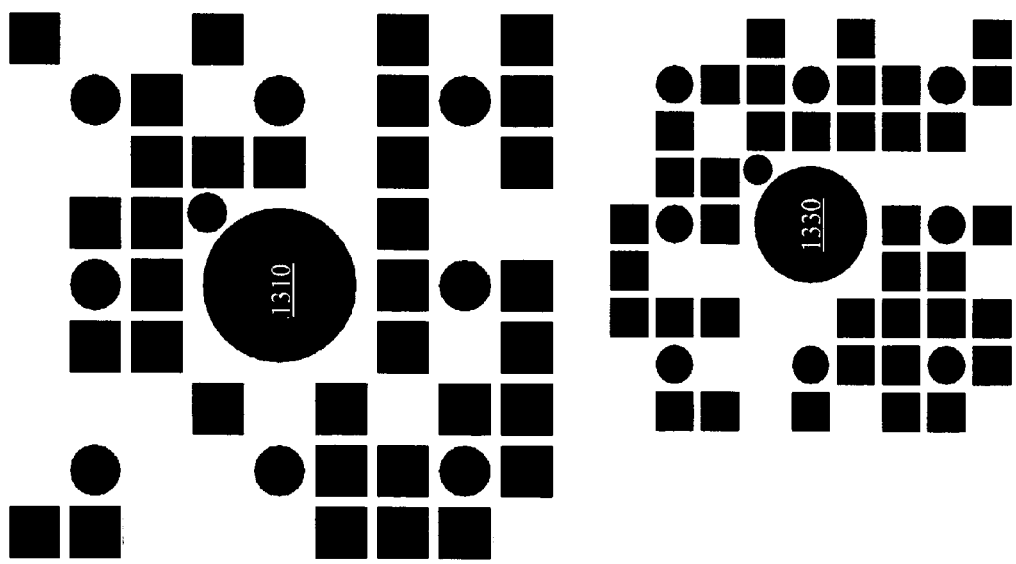

Each of the animated barcodes displayed or printed can contain one or multiple barcodes. For example, either one of FIGS. 9, 10 or 11 is an example of a single barcode that can be uniquely recovered. FIG. 12 shows four (4) barcodes of approximately the same or similar size that each can be uniquely identified. When small barcodes are used, more data can be fit in a given area display or print area. However, small barcodes may result in undecipherable barcodes, resulting in no data being transferred to the barcode receiving device. When large barcodes are used, though, less data can fit within a given display or print area, but a larger number of pixels per module will result and thus decoding can be made more reliable. Furthermore in certain embodiments of the present invention, barcodes of different sizes can be simultaneously or consecutively printed or displayed. Such a set of barcodes 1310-1330 is shown in FIG. 13. This set of barcodes 1310-1330 can eliminate the problem of not being able to transfer any data to a particular capturing device because of capturing constraints of the device, and can balance the transfer rate as small 1330, medium 1310 and large 1320 barcodes can be used together.

Figure 14:
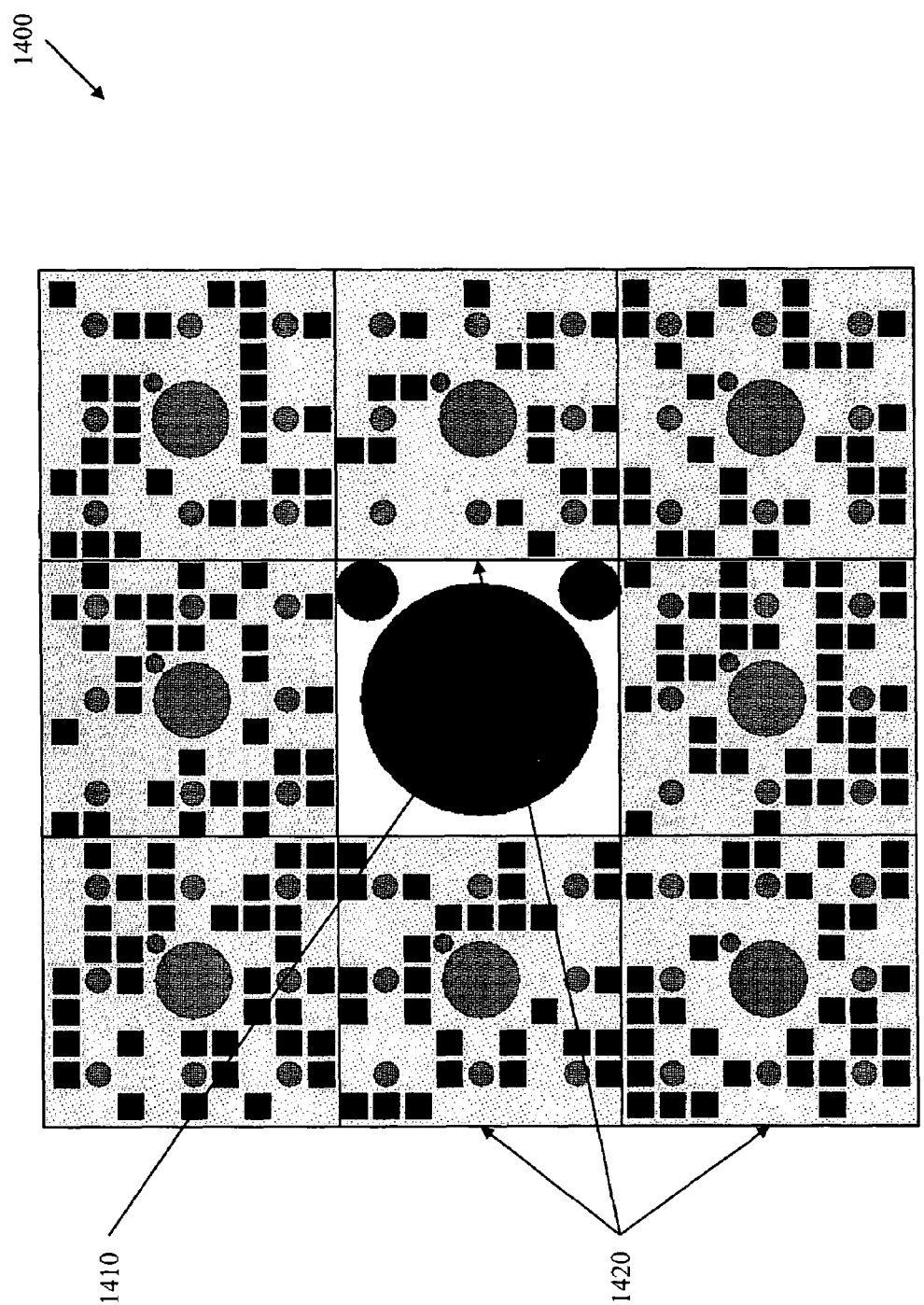
FIG. 14 illustrates a composite barcode where a master finder pattern can be used to indicate the position of the barcode and sub-areas within the composite barcode according to certain embodiments of the present invention.

FIG. 14 illustrates a composite barcode where a master finder pattern can be used to indicate the position of the barcode and sub-areas within the composite barcode according to certain embodiments of the present invention. As shown in FIG. 14, a master finder pattern 1410 can occupy a certain amount of the approximate center area of a composite barcode 1400. Composite barcode 1400 can further include sub-areas 1420 that each can represent a separate data chunk. Even though master finder pattern 1410 occupies space that could be used for an additional sub-area 1420, including master finder pattern 1410 allows for faster decoding as the location of sub-areas 1420 that carry the data can be tied to the location of master finder pattern 1410. In such a scheme, sub-areas 1420 can be individually self consistent (i.e., each can be treated as if it were a separate barcode, with individual recognition patterns and modules) and can be decoded independently. However, once master finder pattern 1410 is located, certain properties of it can be used to locate sub-areas 1420. Thus, even if master finder pattern 1410 cannot be located (e.g., due to bands that occur in CRT monitors), individual barcodes may be still recoverable.

Figure 15:
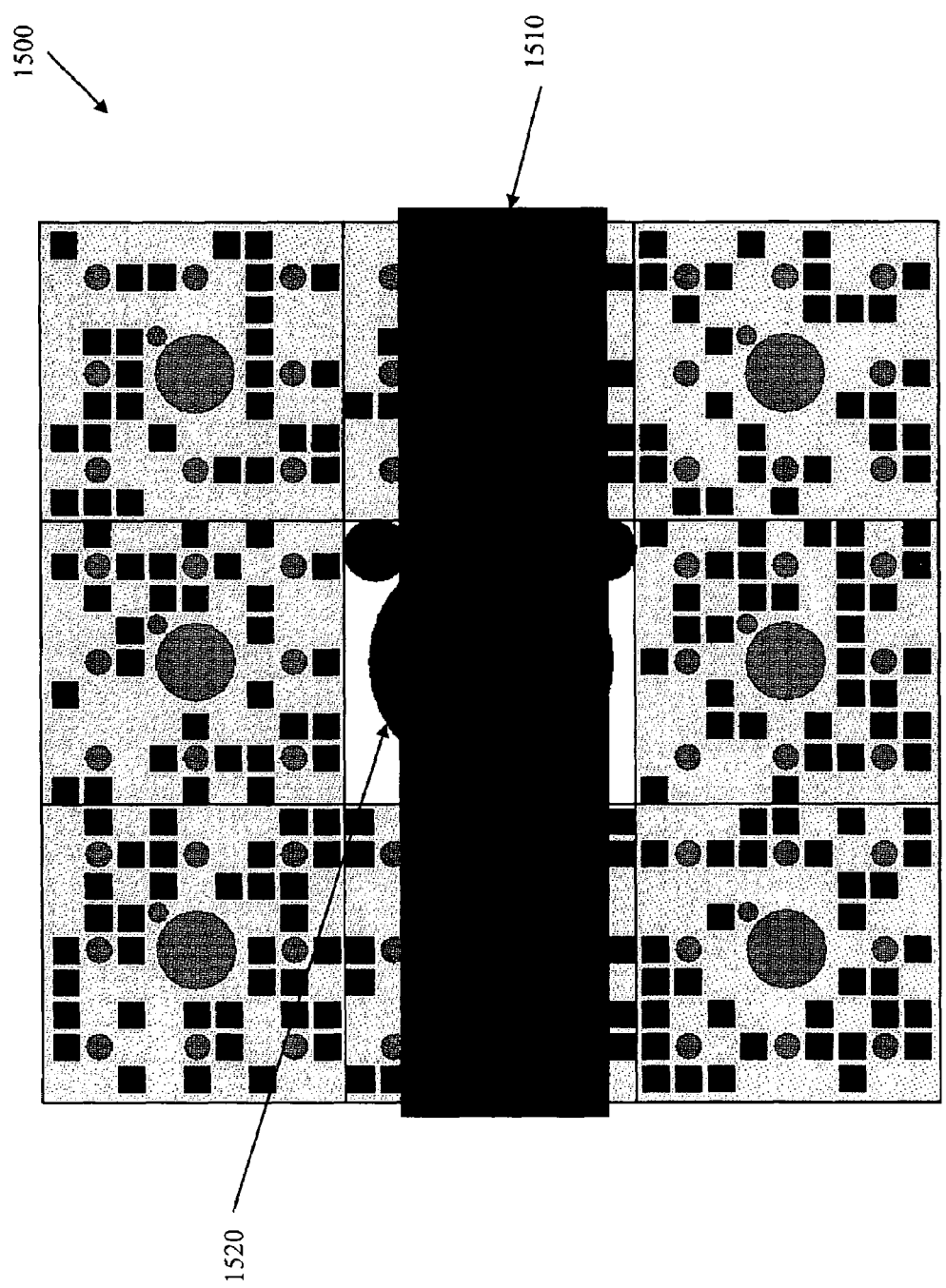
FIGS. 15-16 illustrate the display of a composite barcode through a CRT monitor (not shown) where certain portions of the composite barcode cannot be decoded because of a CRT band, but other portions can be decoded, according to certain embodiments of the present invention.
Figure 16:
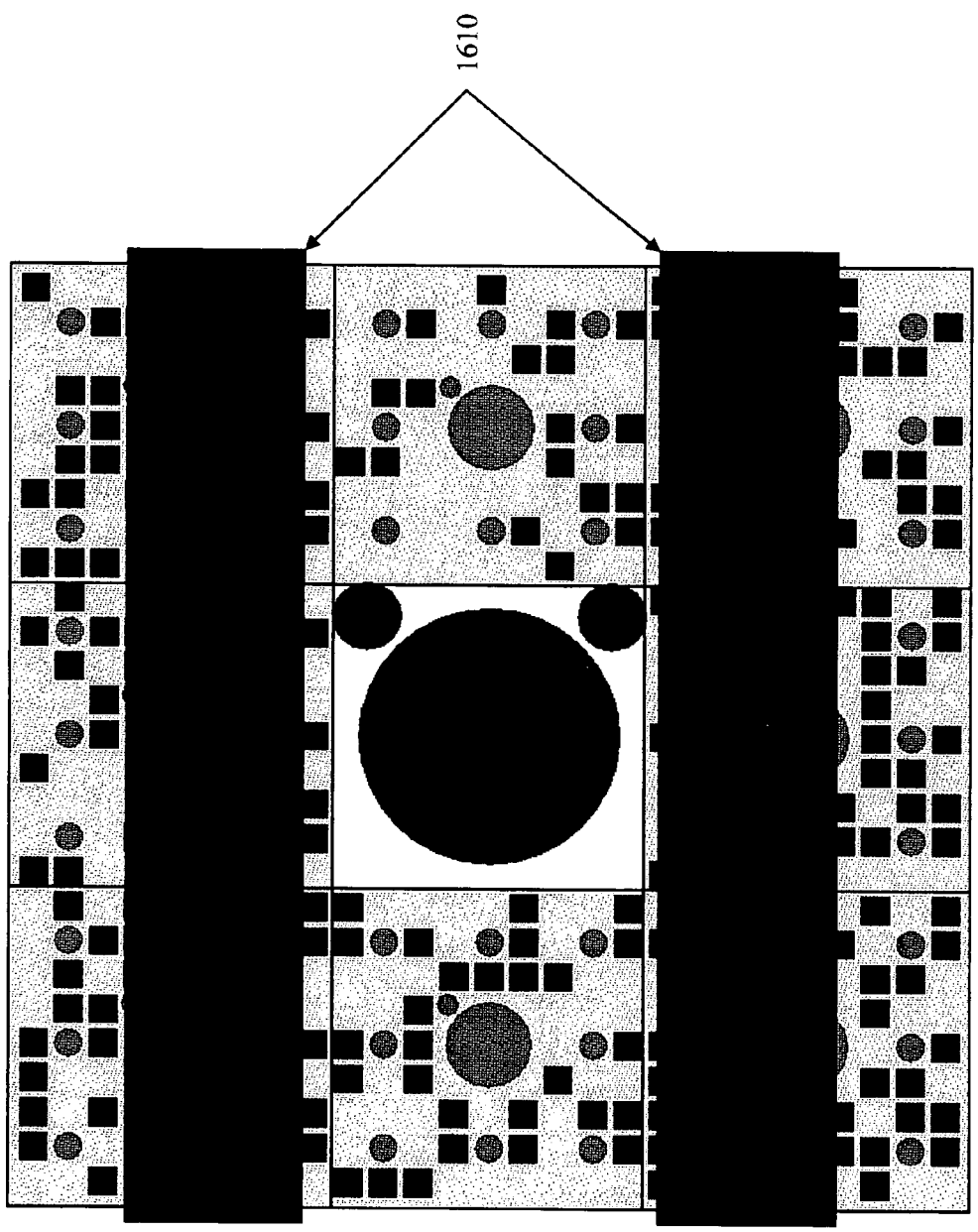

FIGS. 15-16 illustrate the display of a composite barcode through a CRT monitor (not shown) where certain portions of the composite barcode cannot be decoded because of a CRT band, but other portions can be decoded, according to certain embodiments of the present invention. As shown in FIG. 15, single CRT band 1510 can render master finder pattern 1520 undecipherable. However as each sub-area around the master finder pattern can be independently recovered, a certain amount of data, or a certain number of bunches of data, can be still transferred. Furthermore, as shown in FIG. 16, even though the master finder pattern is recoverable, different sets of the sub-areas can be undecipherable due to such bands 1610. However under such circumstances, even though the maximum possible amount of data is not transferred, a certain amount of data can still be transferred to the device.

In certain embodiments of the present invention, the sharing scheme can incorporate a digital fountain scheme. A digital fountain scheme allows generation of data chunks where the number of chunks that will be generated is not predefined. Each generated chunk adds additional redundancy. The recognition stops when a predefined number of chunks are correctly recovered.

In certain embodiments of the present invention, the redundancy schemes can use an identifier to index the encoded chunks of data in the barcode or in the sub-areas of the composite barcode. Thus, each chunk can be assigned an identification code, which code can be unique per chunk per piece of data. The identification code can be transmitted in a number of manners. In one manner, the identification code can be embedded in the barcode itself so that the individually decoded barcode can identify the index of the chunk contain within it. In another manner, the index of the chunk can be recovered from the position of the barcode relative to other barcodes or from the position of one sub-area within a composite barcode. In another manner, if the barcode is an animated barcode, where the individual barcodes are shown as sequential frames, one after another, the index of the chunk can be recovered as a function of the current time of showing/viewing or the sequence frame number relative to the other barcodes.

Furthermore, according to certain embodiments of the present invention, the redundancy schemes can be augmented with checksum or hash codes to detect if the result of data recovery is successful. Such checksum or hash codes are probabilistic by nature so they may not always detect all possible error conditions. To reduce the probability of such occurrences, additional checksums can be added.

Figure 17:
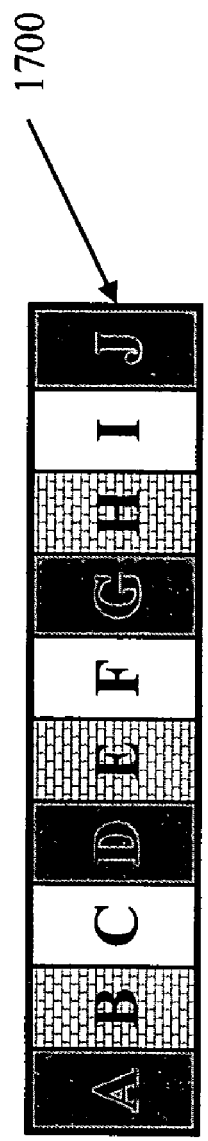
FIG. 17 illustrates an example of data to be transferred according to certain embodiments of the present invention.
Figure 18:
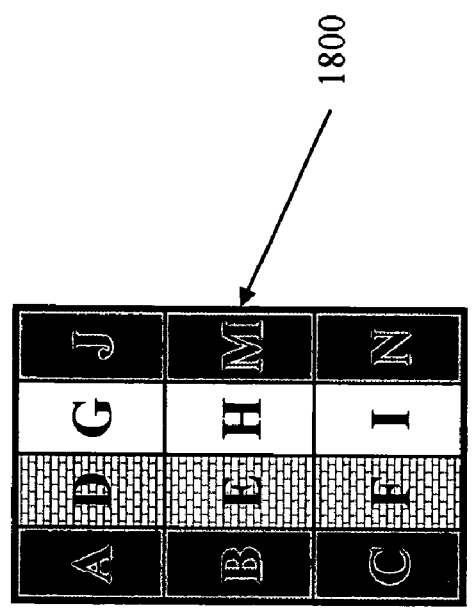
FIG. 18 illustrates the data of FIG. 17 in a column-wise format where a checksum code and padding code has been added according to certain embodiments of the present invention.
Figure 19:
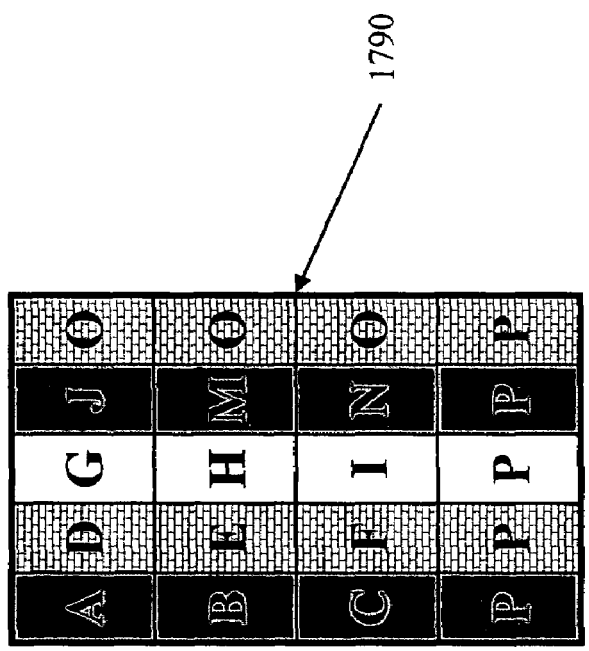
FIG. 19 illustrates the data of FIG. 17 in a column-wise format, where column-wise and row-wise redundancy or checksum data are added according to certain embodiments of the present invention.

FIGS. 17-24 provide examples how redundancy schemes across multiple barcodes or multiple composite barcodes can be generated according to certain embodiments of the present invention. FIG. 17 illustrates an example of data 1700 to be transferred according to certain embodiments of the present invention. The letters A-J can be bits, bytes, words or any size data structure used to represent the data to be transferred via barcodes. FIG. 18 illustrates data 1700 in a column-wise format 1800. A checksum, M, has be added, as well as data padding, N, since the data may not be distributed to the columns evenly. FIG. 19 illustrates data 1700 in a column-wise format 1900, where column-wise and row-wise redundancy or checksum data, O and P, are added according to certain embodiments of the present invention. Such redundancy or checksum data may be used to detect errors in the barcode or correct additional errors.

Figure 20:
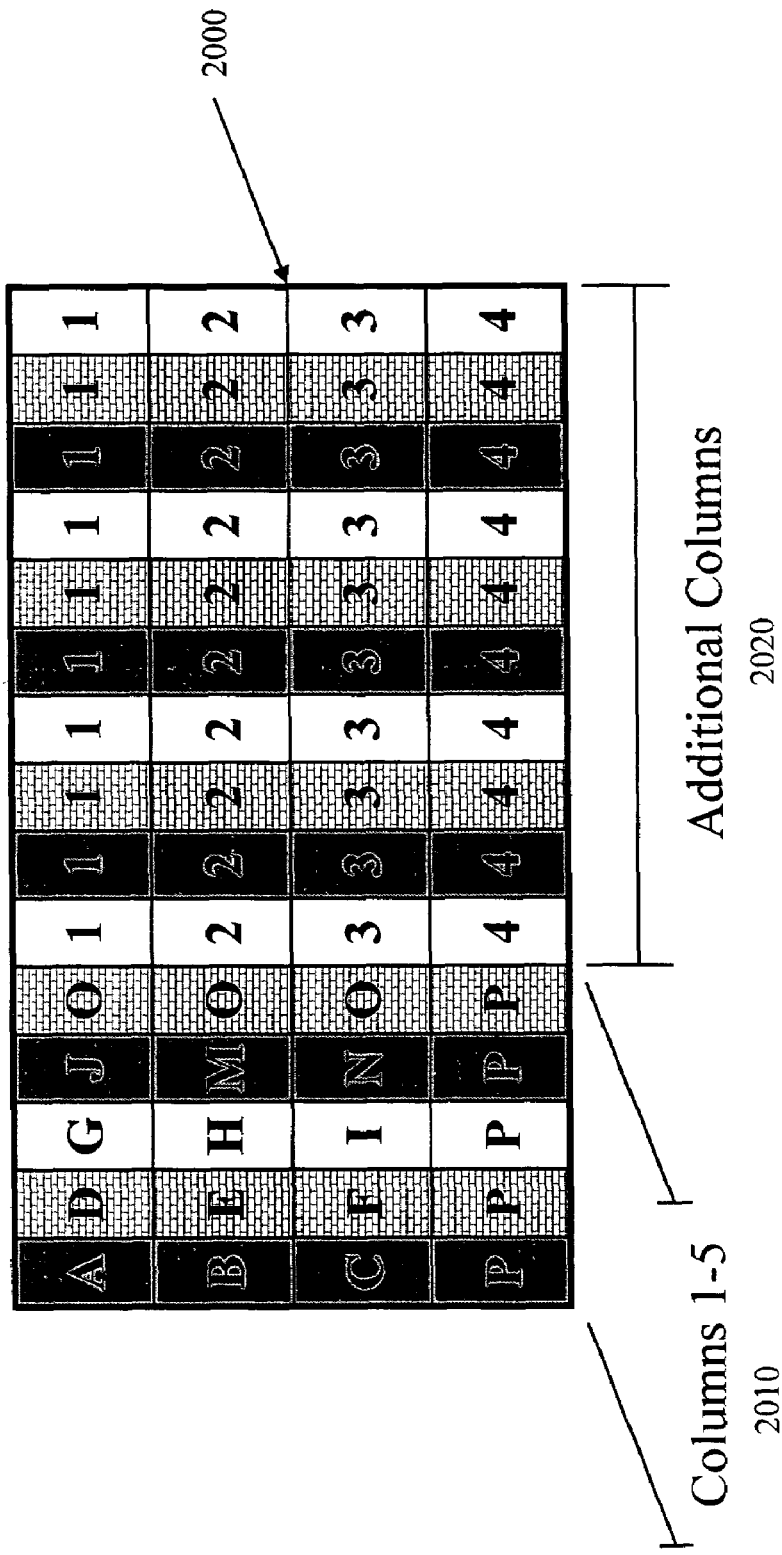
FIG. 20 illustrates the data of FIG. 15 in a column-wise format, where additional columns are created using a redundancy scheme according to certain embodiments of the present invention.

FIG. 20 illustrates data 1700 in a column-wise format 2000, where additional columns 2020 are created/added to the first level redundancy and checksum columns 2010 using a redundancy scheme according to certain embodiments of the present invention. The redundancy can be generated row-wise (i.e., the redundancy in the first row can be used to recover errors in the first row, and so on) or as a whole (i.e., any additional data, 1-4, can be used to correct errors anywhere in the data). The redundancy scheme for generating additional columns 2020 can be for example, Reed Solomon, Digital Fountain codes, and the like.

Figure 21:
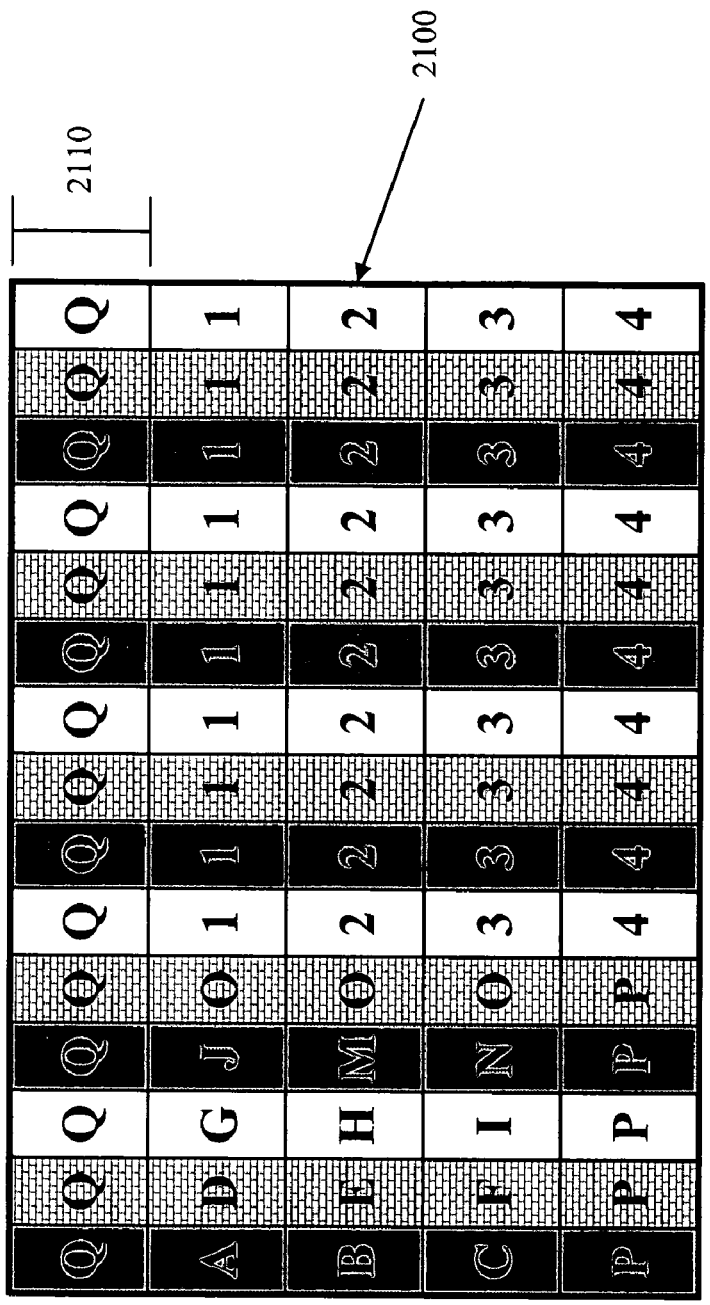
FIG. 21 illustrates the data of FIG. 17 in a column-wise format, where metadata such an assigned index or the number of columns required to recover the data has been added according to certain embodiments of the present invention.

FIG. 21 illustrates data 1700 in a column-wise format 2100, where additional data 2110, or metadata, such an assigned index or the number of columns required to recover the data, has been added according to certain embodiments of the present invention. As shown in FIG. 21, additional data 2110 is optional as both the assigned index and the number of columns required to recover the data can be recovered via other means. For example, the assigned index can be recovered implicitly from the position or sequence of the barcode or of the sub-area of the composite barcode. Likewise, the minimum number of barcodes required to decode the data can be preset to a fixed number (e.g., 1, 5, 10, 50, 100, etc.) or can be a function of certain other metadata related to the barcode, such as the number of modules in the barcode.

Figure 22:
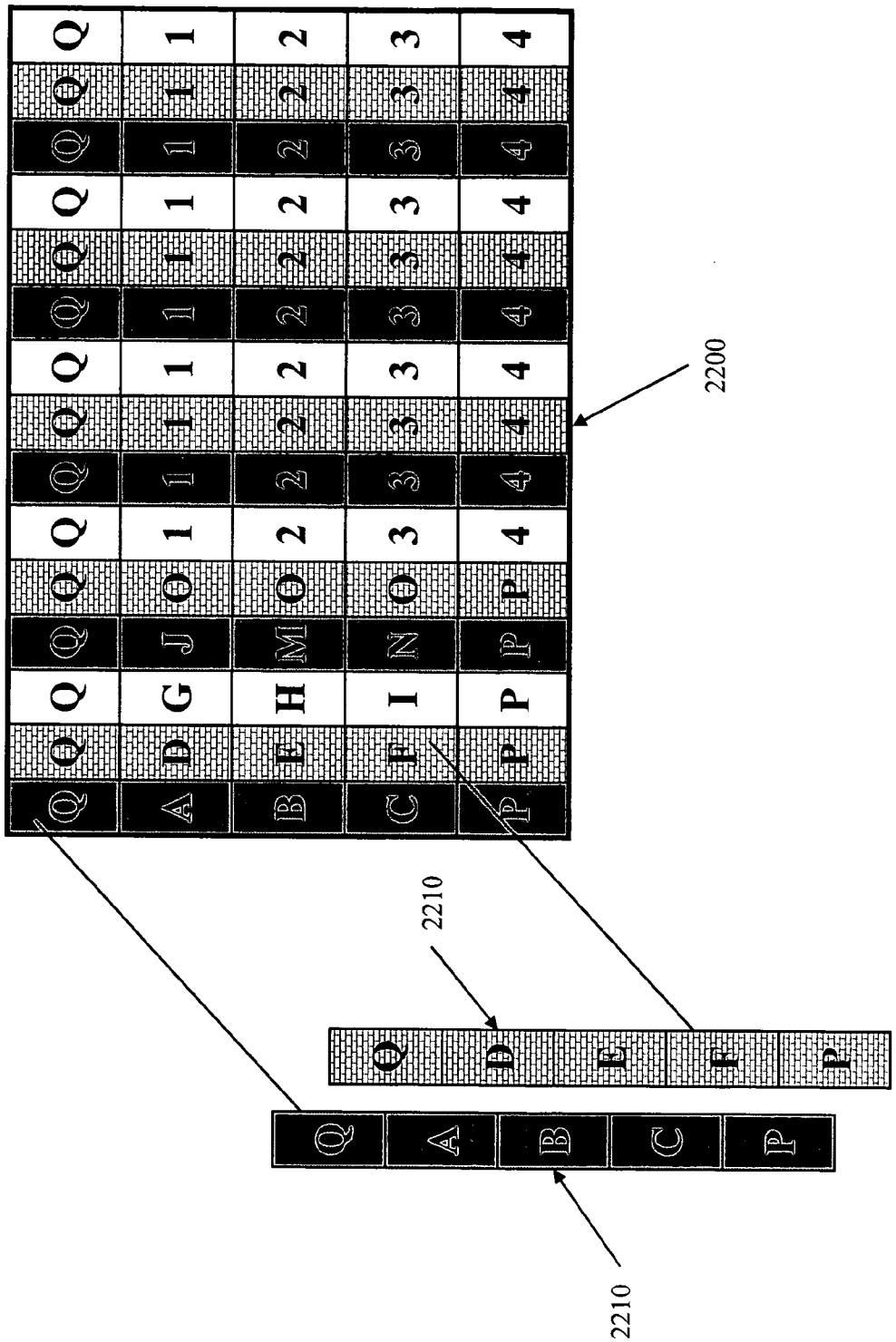
FIG. 22 illustrates that individual columns can be encoded as individual barcodes according to certain embodiments of the present invention.
Figure 23:
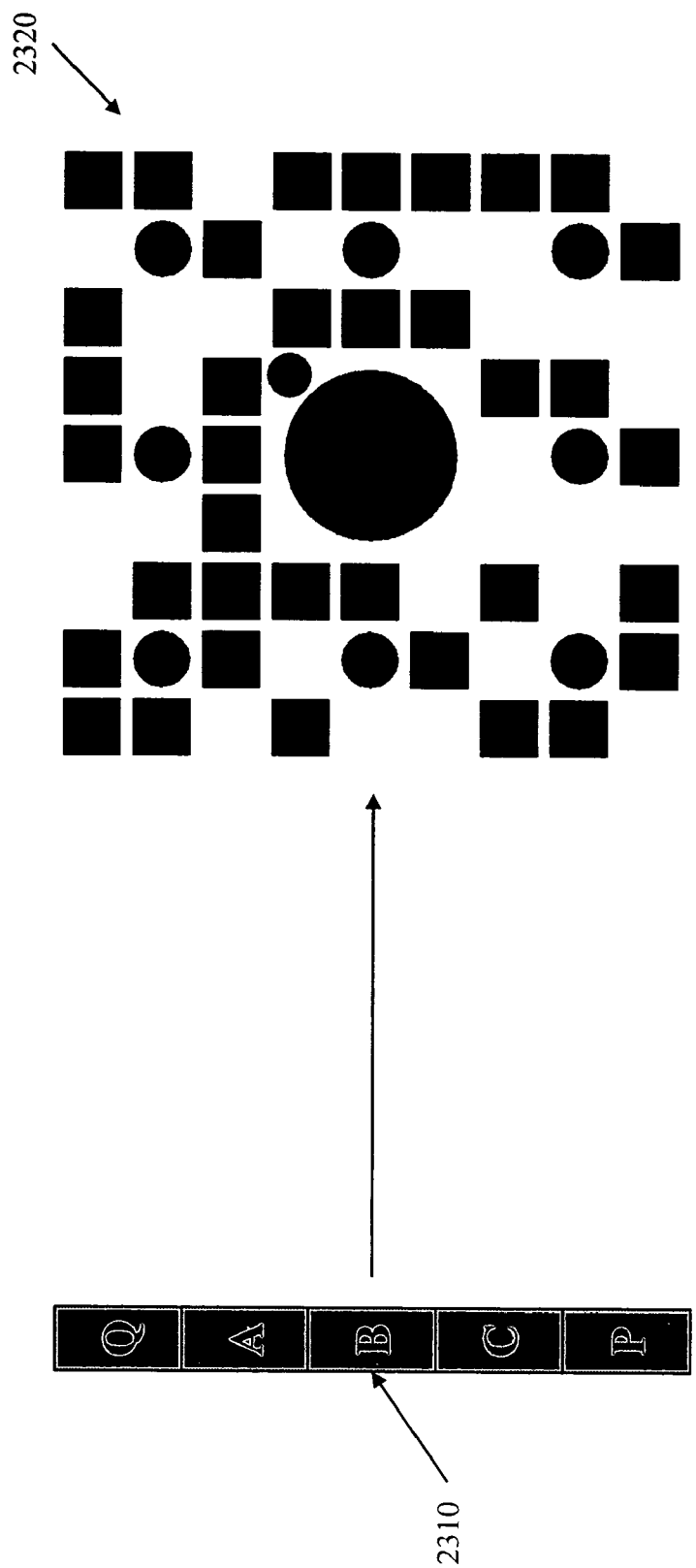
FIG. 23 illustrates a barcode that can be generated from an individual column of data according to certain embodiments of the present invention.

FIG. 22 illustrates that individual columns can be encoded as individual barcodes according to certain embodiments of the present invention. As shown in FIG. 22, data 2200, which is in a column-wise format can be divided into separate columns 2210. Separate columns 2210 can then be encoded as a chunk of data in one or more individual barcodes or in one or more individual sub-areas of a composite barcode. FIG. 23 illustrates a barcode that can be generated from an individual column of data according to certain embodiments of the present invention. As shown in FIG. 23, column chunk of data 2310 is being encoded, or transformed, into barcode 2320.

Figure 24:
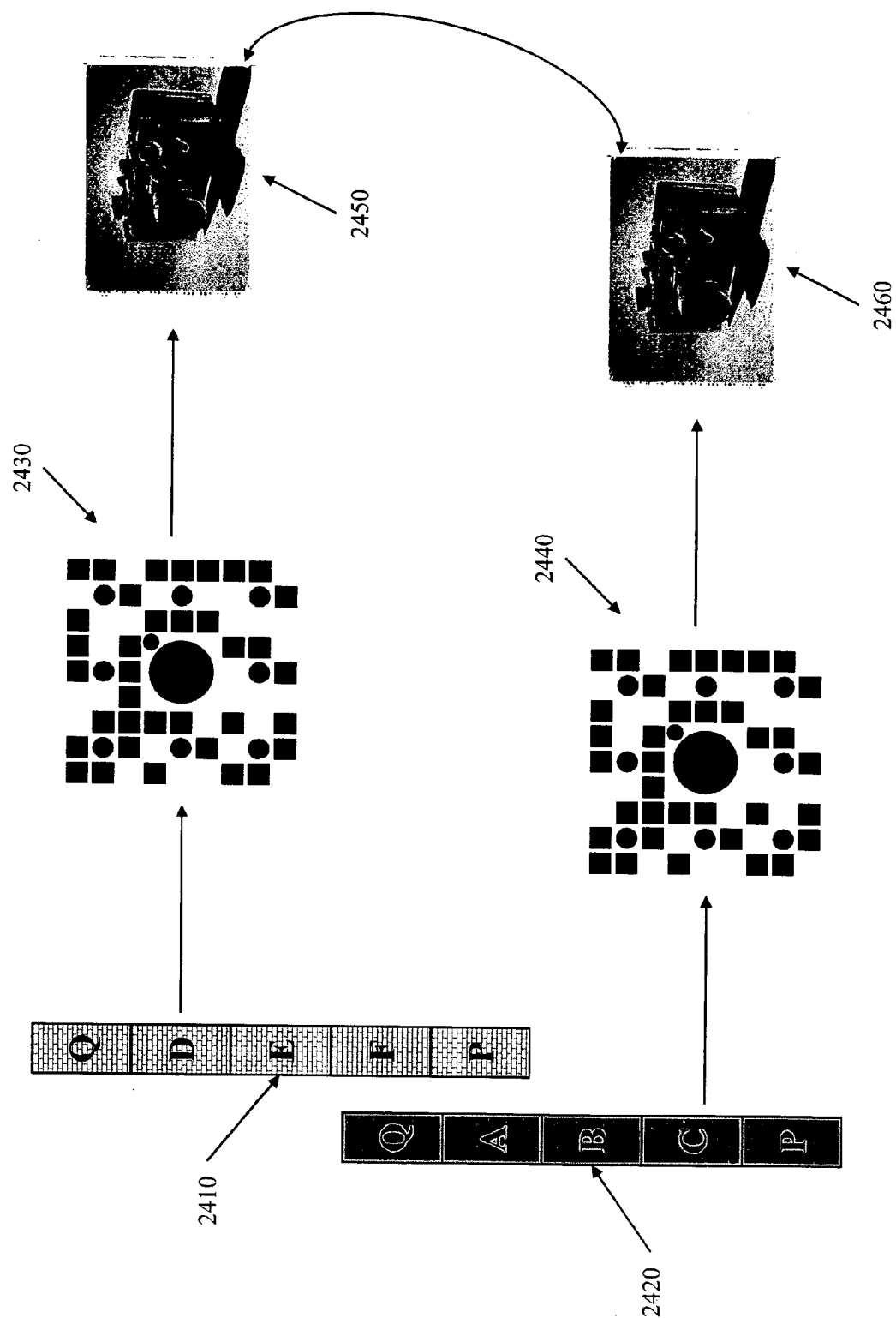
FIG. 24 illustrates how additional channels can be used to increase the transfer speed of data chunks according to certain embodiments of the present invention.

Certain embodiments of the present invention also allow separate chunks of data to be transferred independently through separate channels to the decoding device. FIG. 24 illustrates how additional channels can be used to increase the transfer speed of data chunks according to certain embodiments of the present invention. Such channels could be an additional camera or data connectivity such as Bluetooth, data cable, general packet radio service (GPRS), short message service (SMS), multimedia message service (MMS) or any other wired or wireless transmission means. As shown in FIG. 24, separate chunks of data 2410, 2420 are each transformed into separate barcodes 2430, 2440. If two cameras 2450, 2460 are used, the chunk of data recovered from one camera can be used to increase the transfer rate of data to the other camera. If a camera and a probabilistically error-free channel (such as data cable, Bluetooth, GPRS, SMS, or MMS, 802.11) are used, additional per-barcode redundancy may not need to be used.

If separate data channels are used, then matching between the data channels and the barcodes should be performed. Such matching can be achieved by first displaying one or a set of barcodes to indicate the properties of the additional channel(s). For example, if the additional channel is through a data channel, an identifying pattern can be embedded in the first set of barcodes. For example, the encoding program can post a subset of the chunks that will be transferred to a web space and encode the location (e.g., the URL) of the web space as one or a set of barcodes. It can also indicate a channel where the decoding device can indicate that the decoding of the URL is complete. Once the decoding device recovers the location, it can send a message to the encoding device that the URL has been decoded through the return channel. Once this is complete, the encoding device can start displaying the chunks derived from the data that need to be transferred. The decoding device can now recover the data through these two channels as it can combine both data to increase the transfer rate. The first set of barcodes can furthermore include certain additional parameters, such as a password that was used to encode the data, the network name (e.g., SSID for a 802.11 channel), a network key to prevent outsiders from accessing the other channel (e.g., a WEP or WPA key) and the like.

Figure 25:
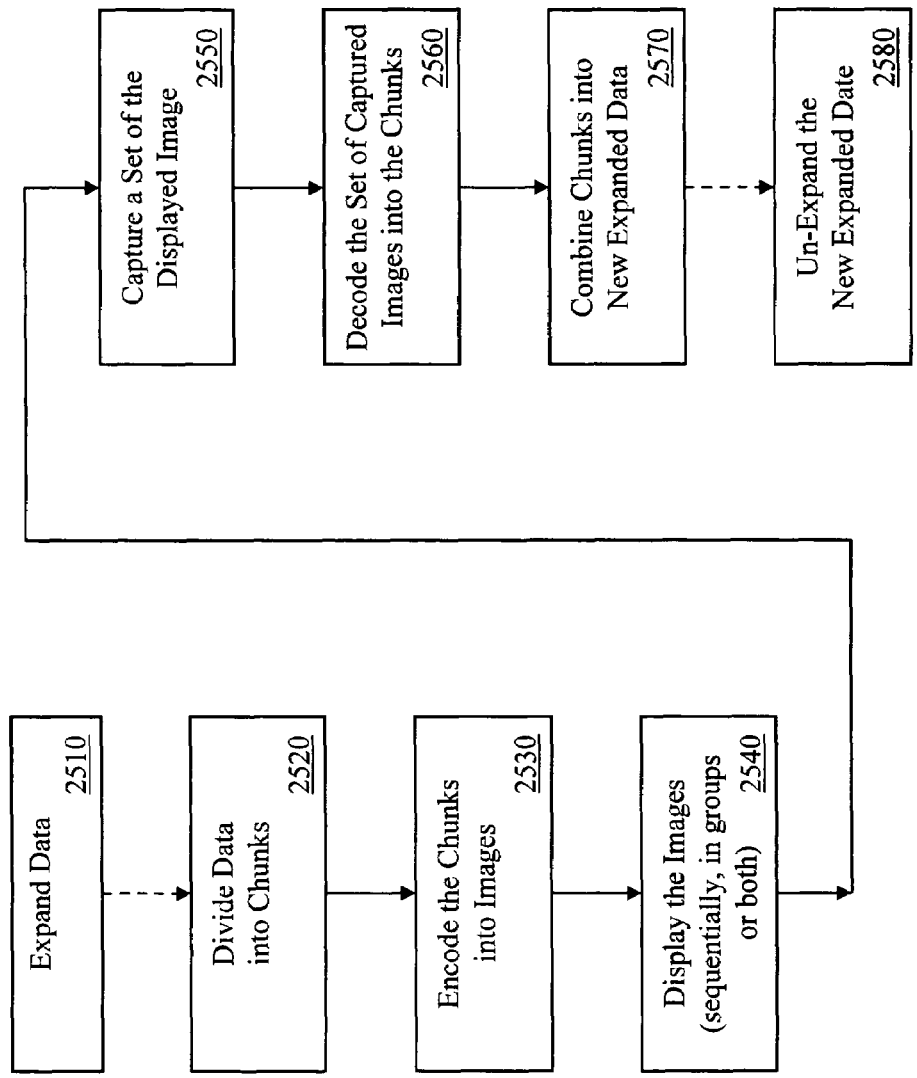
FIG. 25 illustrates an exemplary methodology creating redundant and very high capacity barcodes, which can be used for transferring data to a device according to certain embodiments of the invention.

FIG. 25 illustrates an exemplary methodology creating redundant and very high capacity barcodes, which can be used for transferring data to a device according to certain embodiments of the invention. Generally, the exemplary method includes transferring data to a device through one or more barcode images. The data that will be transferred can be broken into smaller chunks as previously described. Each chunk can then be transformed into a barcode image. The barcode images can be displayed on a display consecutively, one after the other. The receiving device can capture the images through, for example, a camera and decodes the content of each image and reconstructs the data.

As shown in FIG. 25, the source data can be broken into multiple chunks in a two step process, where the first step is optional. The first step 2510 is adding redundancy to the data through, for example, a forward error correction mechanism. The second step 2520 is dividing the data into multiple chunks with or without additional redundancy. The redundancy can alternatively be added through a sharing scheme, also called threshold scheme, or a data splitting scheme where the data is divided into N chunks where any M of the N chunks can be used to reconstruct the data in its entirety. A method to add redundancy through a continuous sharing scheme where the data is divided into chunks of equal length where M chunks can be used to reconstruct the data is also described in this document.

In step 2530, the chunks can be transformed into barcode images. Barcodes facilitate easy reconstruction of each chunk. Each barcode can contain a forward error correction scheme that allows reconstruction of the chunk even though certain portions of the image may be damaged or was not captured correctly by the capturing device.

In step 2540, the barcode image(s) representing the chunk(s) of data can be displayed for capture. This display can be via any pre-printed media, via any electronic visual display or any of visual or electronic means. For example, the electronic visual display can include items such as, but not limited to, a computer screen, cell phone screen, personal digital assistant (PDA) screen, or television screen. Regardless of the display means used, the display can show the barcode image(s) sequentially, simultaneously, in sequential groups, or a combination thereof. If shown sequentially, the images can create a moving image where each frame of the moving image can be a different image or group of images. If shown in groups, then a composite barcode might be used (as discussed above) to display multiple chunks of data at the same time. Further, multiple composite barcodes can also be shown sequentially to create a moving image where each frame of the moving image includes multiple chunks of the original data.

In step 2550, a device can capture a set of the displayed images. The device can use any type of capturing mechanism, such as a camera or scanner, associated with the device to capture the set of displayed images. If the images are shown sequentially, consecutively, or a combination thereof, then the capture rate and resolving capacity of the device should be sufficient to distinguish each, or most, frames of the moving image and/or to resolve the various portions of a composite barcode. For example, if the moving image includes 30 individual barcode frames per minute, then the capture device might include a capture rate of approximately one barcode every two seconds. Likewise, if the moving image includes 30 composite barcode frames per minute, then the capture device might include enough resolution to distinguish each sub-area of each composite barcode (i.e., where each sub-area represents a separate chunk of the original data) as well as a capture rate of approximately one composite barcode every two seconds.

In step 2560, the captured set of displayed images can be decoded into chunks of data. An image recognition algorithm, such as a barcode recognition algorithm, running in the capture device can identify each captured barcode, whether individual or composite. The algorithm can then decode a certain number of these images and convert them into data chunks.

In step 2570, after a defined number of data chunks have been recovered, the chunks can be used to reconstruct the data or, if the original data had been expanded, a new expanded data. In step 2580, if a forward error correction scheme had been used prior to breaking up the data into chunks, then the inverse of the forward error correction scheme can be applied to recover the original data.

As previously discussed, methods according to certain embodiments of the present invention can use a sharing scheme. A sharing scheme allows generation of data chunks where the number of chunks that will be generated need not be predefined. Each generated chunk adds additional redundancy. The capture and decoding can stop when a predefined number of chunks, which can be a set of the original chunks equal to fewer than 100% of the original number of chunks encoded, are correctly recovered. A sharing scheme, such as a redundant residue number system (RRNS), can be used to create continuous redundancy.

For a RRNS, a residue number system (RNS) is defined by a list of p positive integers, $m_1, m_2, \ldots, m_p$ that are relatively prime in pairs, i.e. for all i and j, $i \neq j$, and $\gcd(m_i, m_j)=1$. In an RNS, a positive integer, u, can be represented using p positive integers, $u_1, u_2, \ldots u_p$ such that for $1 \leq i \leq p$, $u_i = u \bmod m_i$ if $u < M$, where $$M = \prod_{i=1}^{p} m_i.$$

Chinese remainder theorem states that given p positive integers, $u_1, u_2, \ldots u_p$, such that for $1 \leq i \leq p$, $u_i < M_i$, there is one and only one positive integer, u, that satisfy the condition $u = u_1 \bmod m_i$ and $u < M$. The interval $[0, M-1]$ is called the legitimate range of the number system. We will use $<u_1, u_2, \ldots u_p>_R$ to denote a number, u, in an RNS, R. If the legitimate range of the number system is restricted to $[0, M_r-1]$, where $$M_r \leq \frac{M}{\max_{i=1}^{p} m_i},$$

then the number system is called an RRNS because for any selected k, $1 \leq k \leq p$, uk can be eliminated from u1, u2, ..., uk, ..., up and the remaining n-1 positive integers still uniquely identify the positive integer u. The interval $[0, Mr-1]$ is called the legitimate range of the RRNS.

To create redundancy for any data so that it can be transferred reliably using methods according to certain embodiments of the present invention, the following procedure can be used. Those skilled in the art will recognize that the following procedure is one of many procedures that may be applicable to one or more methods according to certain embodiments of the present invention.

Let $F_1 = |F|o F$ where F is the data to be transferred or expanded data after a forward error correction algorithm. Select an r such that when the data $F_1$ is divided into r(w−1) bit chunks, $B_1, B_2, \ldots, B_s$. r(w−1) is size of the data that will be encoded in each image, such as the size of the data that will be encoded in the barcode, and w is the bit size for efficient arithmetic operations for the transferring device or transferred device (w is usually 16, 32 or 64). If necessary, pad $B_s$ with additional random bits. Represent each chunk, $B_i$, using (w−1) bit integers, $x_{i1}, x_{i2}, \ldots, x_{ir}$. Set $<u_{i1}, \ldots, u_{ir}> = <x_{i1}, \ldots, x_{ir}>$. These shares are called the primary chunks. Convert the chunks into digital images such as using a barcode encoding algorithm and display these images.

Select r moduli, $<m_1, \ldots, m_i, \ldots, m_r>$ so that $2^{w-1} \leq m_i < 2^w$ and $\gcd(m_i, m_j) = 1$, $(i \neq j)$. There are, by a conservative estimate, $2^{w-lgw-1}$ prime numbers between $2^{w-1}$ and $2^w$. Thus, finding such numbers is not very difficult. For 32-bit machines there are approximately $9*10^7$ such numbers. For 64-bit machines there are approximately $2*10^{17}$ such numbers. By using a brute force approach, we can find r such numbers in $O(r^2 w^2)$. Once such numbers are found, they can be stored and reused.

Assume that $u = <u_{i1}, \ldots, u_{ir}>_R$ in an RRNS. For the first additional redundant chunk, select $m_{r+1}$ so that $2^{w-1} \leq m_{r+1} < 2^w$ and $\gcd(m_i, m_p) = 1$, (for i=1 to r) calculate $u_{ir+1}$ such that $u_{ir+1} = u \bmod m_{r+1}$. Convert this chunk into a digital image such as using a barcode encoding algorithm and display this image. For each additional redundant chunk, select $m_{r+p}$ so that $2^{w-1} \leq m_{r+p} < 2^w$ and $\gcd(m_i, m_{r+p}) = 1$, (for i=1 to r+p) and calculate $u_{ir+p}$ such that $u_{ir+p} = u \bmod m_{r+p}$. Convert these chunks into digital images such as using a barcode encoding algorithm and display these images after one another until a predefined number of such images are displayed or user stops the display of additional images because transmission is complete.

Recovery can be done as follows. When r chunks are transmitted to the device. For $1 \leq i \leq r$, calculate $$M_i = \left( \prod_{j=1}^{r, i \neq j} m_j \right) \bmod m_i$$

and $m_i^{-1}$ such that $m_i^{-1} M_i = 1 \bmod m_i$. For $1 \leq i \leq r$, calculate the following numbers: Let $r_{max}$ be the index of the latest chunk received by the device. For $1 \leq i \leq r$, and $1 \leq j \leq \lceil lgr_{max} \rceil$, $$M_{ij} = \left( \prod_{t=l}^{2^j, i \neq k} m_l \right) \bmod m_i$$

and $m_{ij}^{-1}$ such that $m_{ij}^{-1} M_{ij} = 1 \bmod m_i$.

Recovery can be done using a straightforward method, or any method that allows converting a number expressed in a redundant number system to a natural number system. The straightforward method for converting a number in a redundant number is as follows:

$$u \equiv \left( \sum_{i=1}^{p} u_1 m_1^R \right) \bmod M, \text{ where}$$

$$M = \prod_{i=1}^{p} m_1$$

$$M_i = \frac{M}{m_i}$$

$$m_i^R = m_i^{-1} M_i$$

and $m^{-1}$ is the multiplicative inverse of M; modulo $m_i$ (i.e., $m_i^{-1} M_i \equiv 1 \bmod m_i$).

It should be understood that certain embodiments of the present invention can be implemented in software, hardware, or a combination of both, in the form of control logic in a modular or integrated manner. Furthermore, the use of the word barcode throughout this disclosure and the various barcode figures presented herein is not meant to limit the scope of the invention to any particular barcode symbology.

Although the present invention has been particularly described with reference to certain embodiments thereof, it should be readily apparent to those of ordinary skill in the art that various changes, modifications, substitutes and deletions are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of inventive elements illustrated and described in the above figures. It is intended that the scope of the appended claims include such changes and modifications. The scope of the present invention should, therefore, be determined not with reference to the certain embodiments presented above, but instead should be determined with reference to the pending claims along with their full scope of equivalents.

What is claimed is:

1. A method for transferring information by barcode, the method comprising the steps of:
   expanding original data with calculated data to obtain a set of data, wherein expanding the original data includes adding a checksum to the original data, and adding padding bits to the original data calculated such that, when the set of data is divided, each of the plurality of chunks of data will be of an approximately equal size;
   dividing the set of data into a plurality of chunks of data, wherein the plurality of chunks allows for transference of the set of data; and
   encoding each of the plurality of chunks of data into an individual barcode to obtain a plurality of individual barcodes from which the set of data can be reconstructed;
   and wherein the size of the each chunk of data is between 64 bits and about 200 kilobits.

2. A method for transferring information by barcode, the method comprising the steps of:
   expanding original data with calculated data to obtain a set of data, wherein expanding the original data includes adding data redundancy to the original data;
   dividing the set of data into a plurality of chunks of data, wherein the plurality of chunks allows for transference of the set of data; and
   encoding each of the plurality of chunks of data into an individual barcode to obtain a plurality of individual barcodes from which the set of data can be reconstructed, wherein
   adding the data redundancy includes one or more of:
   (i) dividing the plurality of chunks of data such that a subset of the plurality of chunks of data can be used to reconstruct the original data; and
   (ii) using at least one scheme selected from a set of schemes, the set of schemes including a sharing scheme, a digital fountain scheme, a threshold scheme, a data splitting scheme and a Reed Solomon scheme;
   and wherein the size of the each chunk of data is between 64 bits and about 200 kilobits.

3. The method of claim 2, wherein adding the data redundancy includes dividing the plurality of chunks of data such that a subset of the plurality of chunks of data can be used to reconstruct the original data.

4. A method for transferring information by barcode, the method comprising the steps of:
   expanding original data with calculated data to obtain a set of data, wherein expanding the original data includes adding metadata to the original data;
   dividing the set of data into a plurality of chunks of data, wherein the plurality of chunks allows for transference of the set of data; and
   encoding each of the plurality of chunks of data into an individual barcode to obtain a plurality of individual barcodes from which the set of data can be reconstructed,
   wherein the added metadata includes one or more elements selected from a group of elements, the group of elements including an assigned index and a quantity indicative of a minimum number of the plurality of individual barcodes needed to reconstruct the original data;
   and wherein the size of the each chunk of data is between 64 bits and about 200 kilobits 5. A method for transferring information by barcode, the method comprising the steps of:
   expanding original data with calculated data to obtain a set of data, wherein expanding the original data includes adding a checksum to the original data, and adding data redundancy to the original data;
   dividing the set of data into a plurality of chunks of data, wherein the plurality of chunks allows for transference of the set of data; and
   encoding each of the plurality of chunks of data into an individual barcode to obtain a plurality of individual barcodes from which the set of data can be reconstructed,
   wherein adding the data redundancy includes one or more of:
   (i) dividing the plurality of chunks of data such that a subset of the plurality of chunks of data can be used to reconstruct the original data; and
   (ii) using at least one scheme selected from a set of schemes, the set of schemes including a sharing scheme, a digital fountain scheme, a threshold scheme, a data splitting scheme and a Reed Solomon scheme;
   and wherein the size of the each chunk of data is between 64 bits and about 200 kilobits.

6. The method of claim 5, wherein adding the data redundancy includes dividing the plurality of chunks of data such that a subset of the plurality of chunks of data can be used to reconstruct the original data.

7. A method for transferring information by barcode, the method comprising the steps of:
   expanding original data with calculated data to obtain a set of data, wherein expanding the original data includes adding a checksum to the original data, adding data redundancy to the original data, and adding metadata to the original data;
   dividing the set of data into a plurality of chunks of data, wherein the plurality of chunks allows for transference of the set of data; and
   encoding each of the plurality of chunks of data into an individual barcode to obtain a plurality of individual barcodes from which the set of data can be reconstructed, wherein the added metadata includes one or more elements selected from a group of elements, the group of elements including an assigned index and a quantity indicative of a minimum number of the plurality of individual barcodes needed to reconstruct the original data;

and wherein the size of the each chunk of data is between 64 bits and about 200 kilobits.

8. A method for transferring information by barcode, the method comprising the steps of:
  expanding original data with calculated data to obtain a set of data, wherein expanding the original data includes
    adding a checksum to the original data,
    adding data redundancy to the original data,
    adding metadata to the original data, and
    adding padding bits to the original data calculated such that, when the set of data is divided, each of the plurality of chunks of data will be of an approximately equal size, the size of the each chunk of data lying between about 64 bits and about 200 kilobits;
  dividing the set of data into a plurality of chunks of data, wherein the plurality of chunks allows for transference of the set of data: and
  encoding each of the plurality of chunks of data into an individual barcode to obtain a plurality of individual barcodes from which the set of data can be reconstructed, 9. A method for transferring information by barcode, the method comprising the steps of:
  dividing a set of data into a plurality of chunks of data, wherein the plurality of chunks allows for transference of the set of data;
  encoding each of the plurality of chunks of data into an individual barcode to obtain a plurality of individual barcodes from which the set of data can be reconstructed;
  displaying the plurality of individual barcodes, wherein the step of displaying includes at least one of
    (i) presenting the plurality of individual barcodes in a sequential manner on a video display device at a certain frame rate, wherein at least one individual barcode is displayed per frame, and
    (ii) presenting the plurality of individual barcodes in groups of two or more individual barcodes in a sequential manner on a video display device at a certain frame rate, wherein at least one group is displayed per frame;
  capturing a set of the displayed barcodes;
  decoding the captured set of the displayed barcodes to obtain a plurality of derived chunks of data; and
  combining the derived chunks of data to obtain combined data;
  and wherein the size of the each chunk of data is between 64 bits and about 200 kilobits.

10. The method of claim 9, wherein the certain frame rate is at least approximately 20 frames per second.

11. The method of claim 9, wherein the step of displaying includes presenting the plurality of individual barcodes in groups of two or more individual barcodes in a sequential manner on a video display device at a certain frame rate, wherein at least one group is displayed per frame.

12. The method of claim 11, wherein the certain frame rate is at least approximately 20 frames per second.

13. The method of claim 11, wherein the step of capturing uses one of a mobile phone camera and a computer video capture device.

14. A method for transferring information by barcode, the method comprising the steps of:
  expanding original data with calculated data to obtain a set of data;
  dividing the set of data into a plurality of chunks of data, wherein the plurality of chunks allows for transference of the set of data; and
  encoding each of the plurality of chunks of data into an individual barcode to obtain a plurality of individual barcodes from which the set of data can be reconstructed;
  displaying each individual barcode;
  capturing a set of the displayed barcodes, wherein the captured set of the displayed barcodes includes less than all of the individual barcodes;
  decoding the captured set of the displayed barcodes to obtain a plurality of derived chunks of data, wherein the plurality of derived chunks of data includes less than all of the plurality of chunks of data;
  combining the derived chunks of data to obtain combined data, wherein the combined data is a copy of the set of data; and
  un-expanding the combined data to obtain the original data;
  and wherein the size of the each chunk of data is between 64 bits and about 200 kilobits.

15. A method for receiving a set of data transmitted using barcodes, the method comprising the steps of:
  capturing a set of barcodes from a display of a plurality of individual barcodes;
  decoding the captured set of barcodes to obtain a plurality of derived chunks of data; and
  combining the plurality of derived chunks of data to obtain combined data, wherein the plurality of individual barcodes is displayed by presenting the plurality of individual barcodes in one of
    (i) a sequential manner on a video display device at a certain frame rate, wherein at least one individual barcode is displayed per frame, and
    (ii) groups of two or more in a sequential manner on a video display device at the certain frame rate, wherein at least one group is displayed per frame;
  and wherein the size of the each chunk of data is between 64 bits and about 200 kilobits.

16. The method of claim 15, wherein the certain frame rate is at least approximately 20 frames per second.

17. The method of claim 15, wherein the plurality of individual barcodes is displayed by presenting the plurality of individual barcodes in groups of two or more in a sequential manner on a video display device at a certain frame rate, wherein at least one group is displayed per frame.

18. The method of claim 17, wherein the certain frame rate is at least 20 frames per second.

19. The method of claim 17, wherein the step of capturing uses one of a mobile phone camera and a computer video capture device.

20. A method for receiving a set of data transmitted using barcodes, the method comprising the steps of:
  capturing a set of barcodes from a display of a plurality of individual barcodes;
  decoding the captured set of barcodes to obtain a plurality of derived chunks of data;
  combining the plurality of derived chunks of data to obtain combined data; and
  un-expanding the combined data to obtain a copy representative of the original data, wherein the captured set of barcodes includes fewer barcodes than the plurality of individual barcodes and the combined data includes data redundancy sufficient to obtain the set of data from the combined data;

and wherein the size of the each chunk of data is between 64 bits and about 200 kilobits.

21. A method for transferring information using barcodes, the method comprising the steps of:
expanding original data with calculated data to obtain a set of data, wherein the step of expanding includes adding a checksum to the original data;
dividing the set of data into a plurality of chunks of data, wherein the plurality of chunks allows for transference of the set of data;
encoding each of the plurality of chunks of data into an individual barcode segment to obtain a plurality of individual barcode segments; and
merging the plurality of individual barcode segments into at least one composite barcode from which the set of data can be reconstructed, wherein
the step of expanding further includes adding padding bits to the original data such that, when the set of data is divided, each of the plurality of chunks of data will be of an approximately equal size;
and wherein the size of the each chunk of data is between 64 bits and about 200 kilobits.

22. The method of claim 21, wherein the step of expanding includes adding data redundancy to the set of data.

23. The method of claim 21, wherein the step of expanding includes adding metadata to the set of data.

24. The method of claim 21, wherein the step of expanding includes adding data redundancy to the set of data.

25. A method for transferring information using barcodes, the method comprising the steps of:
expanding original data with calculated data to obtain a set of data, wherein the step of expanding includes adding data redundancy to the set of data;
dividing the set of data into a plurality of chunks of data, wherein the plurality of chunks allows for transference of the set of data;
encoding each of the plurality of chunks of data into an individual barcode segment to obtain a plurality of individual barcode segments; and
merging the plurality of individual barcode segments into at least one composite barcode from which the set of data can be reconstructed, wherein
adding the data redundancy includes one or more of:
(i) dividing the plurality of chunks of data such that a subset of the plurality of chunks of data can be used to reconstruct the original data; and
(ii) using at least one scheme selected from a set of schemes, the set of schemes including a sharing scheme, a digital fountain scheme, a threshold scheme, a data splitting scheme and a Reed Solomon scheme;
and wherein the size of the each chunk of data is between 64 bits and about 200 kilobits.

26. The method of claim 25, wherein adding the data redundancy includes dividing the plurality of chunks of data such that a subset of the plurality of chunks of data can be used to reconstruct the original data.

27. A method for transferring information using barcodes, the method comprising the steps of:
expanding original data with calculated data to obtain a set of data, wherein the step of expanding includes adding metadata to the original data and adding data redundancy to the set of data;
dividing the set of data into a plurality of chunks of data, wherein the plurality of chunks allows for transference of the set of data;
encoding each of the plurality of chunks of data into an individual barcode segment to obtain a plurality of individual barcode segments; and
merging the plurality of individual barcode segments into at least one composite barcode from which the set of data can be reconstructed,
wherein the added metadata includes one or more elements selected from a group of elements, the group of elements including an assigned index and a quantity indicative of a minimum number of the plurality of individual barcodes needed to reconstruct the original data;
and wherein the size of the each chunk of data is between 64 bits and about 200 kilobits.

28. A method for transferring information using barcodes, the method comprising the steps of:
dividing a set of data into a plurality of chunks of data, wherein the plurality of chunks allows for transference of the set of data;
encoding each of the plurality of chunks of data into an individual barcode segment to obtain a plurality of individual barcode segments;
merging the plurality of individual barcode segments into at least one composite barcode from which the set of data can be reconstructed;
displaying the at least one composite barcode;
capturing the displayed at least one composite barcode;
decoding the captured at least one composite barcode to obtain a plurality of derived chunks of data; and
combining the derived chunks of data to obtain combined data, wherein
the step of displaying includes presenting the at least one composite barcode in a sequential manner on a video display device at a certain frame rate, wherein one or more composite barcode is displayed per frame;
and wherein the size of the each chunk of data is between 64 bits and about 200 kilobits.

29. The method of claim 28, wherein the certain frame rate is at least 20 frames per second.

30. The method of claim 28, wherein the step of capturing uses one of a mobile phone camera and a computer video capture device.

31. The method of claim 28, further including the step of un-expanding the combined data to obtain the original data.

32. A method for transferring information using barcodes, the method comprising the steps of:
dividing a set of data into a plurality of chunks of data, wherein the plurality of chunks allows for transference of the set of data;
encoding each of the plurality of chunks of data into an individual barcode segment to obtain a plurality of individual barcode segments;
merging the plurality of individual barcode segments into at least one composite barcode from which the set of data can be reconstructed;
displaying the at least one composite barcode;
capturing a set of the displayed at least one composite barcode;
decoding the captured set of composite barcodes to obtain a plurality of derived chunks of data; and
combining the derived chunks of data to obtain combined data;
and wherein the size of the each chunk of data is between 64 bits and about 200 kilobits.

33. The method of claim 32, further including the steps of: un-expanding the combined data to obtain the original data.

34. A method for communicating information through barcode transfer, the method comprising the steps of:
displaying at least one composite barcode, wherein the at least one composite barcode represents a plurality of chunks of data divided from a set of data;
capturing one or more of the displayed at least one composite barcode;
decoding the captured one or more composite barcode to obtain a plurality of derived chunks of data; and
combining the plurality of derived chunks of data to obtain combined data, wherein the step of displaying includes presenting the at least one composite barcode in a sequential manner on a video display device at a certain frame rate, wherein at least one composite barcode is displayed per frame;
and wherein the size of the each chunk of data is between 64 bits and about 200 kilobits.

35. The method of claim 34, wherein the certain frame rate is at least 20 frames per second.

36. The method of claim 34, wherein the step of capturing uses one of a mobile phone camera and a computer video capture device.

37. The method of claim 34, further including the step of un-expanding the combined data to obtain a copy representative of the original data.

38. A system for transferring information comprising:
means for expanding original data with calculated data to obtain a set of data, wherein the means for expanding includes means for adding a checksum to the original data and means for adding padding bits to the original data such that, when the set of data is divided, each of the plurality of chunks of data will be of an approximately equal size;
means for dividing a set of data into a plurality of chunks of data, wherein the plurality of chunks allows for transference of the set of data; and
means for encoding each of the plurality of chunks of data into an individual barcode to obtain a plurality of individual barcodes from which the set of data can be reconstructed;
and wherein the size of the each chunk of data is between 64 bits and about 200 kilobits.

39. The system of claim 38, wherein the means for expanding includes means for adding data redundancy to the original data.

40. The system of claim 38, wherein the means for expanding includes means for adding metadata to the original data.

41. A system for transferring information comprising:
means for dividing a set of data into a plurality of chunks of data, wherein the plurality of chunks allows for transference of the set of data;
means for encoding each of the plurality of chunks of data into an individual barcode to obtain a plurality of individual barcodes from which the set of data can be reconstructed;
means for displaying the plurality of individual barcodes;
means for capturing a set of the displayed barcodes;
means for decoding the captured set of barcodes to obtain a plurality of derived chunks of data; and
means for combining the derived chunks of data to obtain combined data, wherein
the means for displaying includes at least one of
 (i) means for presenting the plurality of individual barcodes in a sequential manner on a video display device at a certain frame rate, wherein at least one individual barcode is displayed per frame, and
 (ii) means for presenting the plurality of individual barcodes in groups of two or more individual barcodes in a sequential manner on a video display device at a certain frame rate, wherein at least one group is displayed per frame
and wherein the size of the each chunk of data is between 64 bits and about 200 kilobits.

42. The system of claim 41, wherein the certain frame rate is at least 20 frames per second.

43. The system of claim 41, wherein the means for displaying includes means for presenting the plurality of individual barcodes in groups of two or more individual barcodes in a sequential manner on a video display device at a certain frame rate, wherein at least one group is displayed per frame.

44. The system of claim 43, wherein the certain frame rate is at least 20 frames per second.

45. The system of claim 41, wherein the means for capturing uses one of a mobile phone camera and a computer video capture device.

46. A system for transferring information comprising:
means for expanding original data with calculated data to obtain a set of data, wherein the means for expanding includes means for adding padding bits to the original data such that, when the set of data is divided, each of the plurality of chunks of data will be of an approximately equal size;
means for dividing a set of data into a plurality of chunks of data, wherein the plurality of chunks allows for transference of the set of data;
means for encoding each of the plurality of chunks of data into an individual barcode to obtain a plurality of individual barcodes from which the set of data can be reconstructed;
means for displaying each individual barcode;
means for capturing certain of the displayed barcodes;
means for decoding the captured certain displayed barcodes to obtain a plurality of derived chunks of data;
means for combining the derived chunks of data to obtain combined data; and
means for un-expanding the combined data to obtain the original data, wherein
the captured certain displayed barcodes includes less than all of the individual barcodes;
the plurality of derived chunks of data includes less than all of the plurality of chunks of data; and
the combined data is a copy of the set of data;
and wherein the size of the each chunk of data is between 64 bits and about 200 kilobits.

47. An individual barcode, comprising:
a unique identifier indexing one of a plurality of chunks of data in a set of data;
a plurality of modules adapted for transferring the one chunk of data, each of the plurality of modules having a predetermined location relative to other modules; and
a plurality of patterns adapted to facilitate recognition of the locations of each of the plurality of modules within the individual barcode,
wherein each of the patterns and the plurality of modules includes, a size, a shape, a color and a location within the individual barcode, such that the individual barcode includes a plurality of sizes, a plurality of shapes and a plurality of colors, wherein the plurality of patterns includes a finder pattern, one or more position detection patterns, one or more orientation detection patterns and one or more format/version information patterns;
and wherein the size of the each chunk of data is between 64 bits and about 200 kilobits.

* * * * *